(12) United States Patent
Nishikawa

(10) Patent No.: US 9,818,403 B2
(45) Date of Patent: Nov. 14, 2017

(54) SPEECH RECOGNITION METHOD AND SPEECH RECOGNITION DEVICE

(71) Applicant: Panasonic Intellectual Property Corporation of America, Torrance, CA (US)

(72) Inventor: Tsuyoki Nishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 135 days.

(21) Appl. No.: 14/923,912

(22) Filed: Oct. 27, 2015

(65) Prior Publication Data

US 2016/0049150 A1    Feb. 18, 2016

Related U.S. Application Data

(63) Continuation of application No. PCT/JP2014/003459, filed on Jun. 30, 2014.

(60) Provisional application No. 61/910,193, filed on Nov. 29, 2013, provisional application No. 61/871,544, filed on Aug. 29, 2013.

(51) Int. Cl.
G10L 21/00 (2013.01)
G10L 15/22 (2006.01)
G10L 21/0216 (2013.01)

(52) U.S. Cl.
CPC ........ *G10L 15/22* (2013.01); *G10L 2015/223* (2013.01); *G10L 2021/02166* (2013.01)

(58) Field of Classification Search
CPC ..... G10L 15/20; G10L 15/26; G10L 21/0208; G10L 25/24; G10L 2015/223; G10L 21/02; G10L 21/0364; G10L 21/057; G10L 25/60

USPC ....... 704/230, 231, 233, 251, 250, 255, 257, 704/270, 275

See application file for complete search history.

(56) References Cited

U.S. PATENT DOCUMENTS

| | | |
|---|---|---|
| 2009/0018828 A1 | 1/2009 | Nakadai et al. |
| 2009/0055180 A1* | 2/2009 | Coon .................. B60R 16/0373 704/251 |

(Continued)

FOREIGN PATENT DOCUMENTS

| | | |
|---|---|---|
| JP | 7-064595 | 3/1995 |
| JP | 2002-034092 | 1/2002 |

(Continued)

OTHER PUBLICATIONS

International Search Report of PCT application No. PCT/JP2014/003459 dated Sep. 30, 2014.

*Primary Examiner* — Huyen Vo
(74) *Attorney, Agent, or Firm* — Greenblum & Bernstein, P.L.C.

(57) ABSTRACT

A speech recognition method is provided that recognizes speech for causing equipment to operate. The method includes acquiring a speech signal from a microphone disposed in a designated space. The method also includes detecting a spatial sound pressure distribution indicating a distribution of sound pressure in the space, on the basis of the acquired speech signal, and detecting a point sound source in the space on the basis of the detected spatial sound pressure distribution. The method further includes judging to conduct a speech recognition process on the acquired speech signal when the point sound source is detected.

13 Claims, 26 Drawing Sheets

(56) References Cited

U.S. PATENT DOCUMENTS

| | | | |
|---|---|---|---|
| 2009/0150146 A1* | 6/2009 | Cho | G10L 15/20 704/233 |
| 2011/0082690 A1* | 4/2011 | Togami | H04R 1/406 704/201 |
| 2011/0301950 A1 | 12/2011 | Ouchi et al. | |
| 2012/0101821 A1* | 4/2012 | Tsuda | G10L 15/22 704/243 |
| 2012/0128165 A1 | 5/2012 | Visser et al. | |
| 2013/0325484 A1* | 12/2013 | Chakladar | G10L 15/26 704/275 |
| 2015/0058003 A1* | 2/2015 | Mohideen | G10L 15/20 704/233 |

FOREIGN PATENT DOCUMENTS

| | | |
|---|---|---|
| JP | 2006-058395 | 3/2006 |
| JP | 2009-071510 | 4/2009 |
| JP | 2010-217754 | 9/2010 |
| WO | 2005/048239 | 5/2005 |
| WO | 2012/058229 | 5/2012 |

* cited by examiner

SPEECH RECOGNITION METHOD AND SPEECH RECOGNITION DEVICE

BACKGROUND

1. Technical Field

The present disclosure relates to a speech recognition method and a speech recognition device that recognize speech spoken by a user.

2. Description of the Related Art

Technology to prevent incorrect operation of speech recognition is being investigated. Japanese Unexamined Patent Application Publication No. 7-64595 discloses a speech recognition device equipped with a reflective sensor including a light emitter and a light sensor. Japanese Unexamined Patent Application Publication No. 2010-217754 describes a speech input device equipped with an angle detector that detects an angle of a speech input unit, and a distance detector that detects the distance between the speech input unit and the user.

SUMMARY

One non-limiting and exemplary embodiment provides a speech recognition method and a speech recognition device able to prevent incorrect operation of speech recognition with a low-cost configuration.

In one general aspect, the techniques disclosed here feature a speech recognition method that recognizes speech for causing equipment to operate, including: a speech signal acquiring step of acquiring speech signal from a microphone disposed in a designated space; a spatial sound pressure distribution detecting step of detecting a spatial sound pressure distribution indicating a distribution of sound pressure in the space, on the basis of the speech signal acquired in the speech signal acquiring step; a point sound source detecting step of detecting a point sound source in the space on the basis of the spatial sound pressure distribution detected in the spatial sound pressure distribution detecting step; and a speech recognition controlling step of judging to conduct a speech recognition process on the speech signal acquired in the speech signal acquiring step when the point sound source is detected in the point sound source detecting step.

According to the present disclosure, incorrect operation of speech recognition may be prevented with a low-cost configuration.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
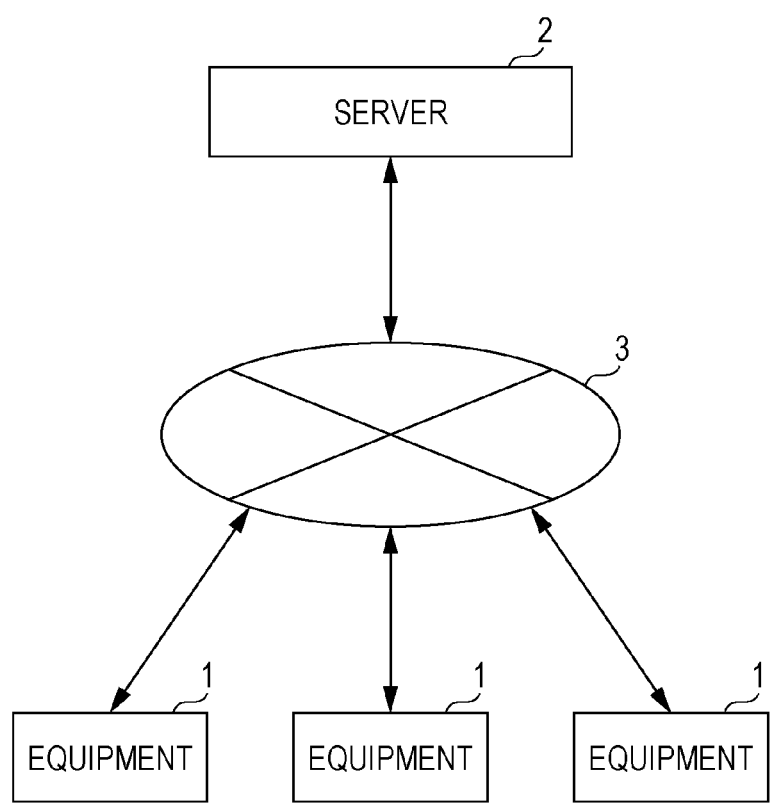
FIG. 1 is a diagram illustrating a configuration of a speech recognition system according to Embodiment 1 of the present disclosure.

DETAILED DESCRIPTION (Underlying Knowledge Forming Basis of the Present Disclosure)

In the related art, a function of controlling a terminal via speech and a keyword search function using speech are being investigated. To realize these functions, in the related art, speech is picked up by a microphone installed on board a remote control for operating the terminal. Recently, in order to further improve usability, the microphone is built into the terminal, and acoustic processing technology enabling the terminal to be operated even if the user speaks from a location separated from the terminal is being investigated.

However, when the user speaks from a location separated from the terminal, since the user and the microphone are separated, volume differences disappear between the user's speech and unwanted ambient sounds, making it difficult for a speech recognition device to correctly recognize spoken content. Accordingly, a speech recognition device needs to distinguish between speech spoken by the user to the terminal, and other sounds (for example, distant conversation, muttering, or sounds emitted by home appliances and the like present nearby). As a means of solving such problems, means of switching the speech input state on and off are being investigated.

For example, in Japanese Unexamined Patent Application Publication No. 7-64595, a speech recognition device is equipped with a reflective sensor including a light emitter and a light sensor. The speech recognition device uses differences between the level of reflected light sensed when a person is present and the level of reflected light sensed when a person is not present to detect the user's position, and prevent incorrect operation of speech recognition.

Meanwhile, in Japanese Unexamined Patent Application Publication No. 2010-217754, a speech input device is equipped with an angle detector that detects an angle of a speech input unit, and a distance detector that detects the distance between the speech input unit and the user. For the angle detector, an angle detecting instrument such as an acceleration sensor or a mechanical inclinometer is used. For the distance detector, an optical sensor using a light sensor such as a position detecting sensor, a charge-coupled device sensor, or a complementary metal-oxide-semiconductor, or an ultrasonic sensor is used. In the speech input device of the related art, the on/off state of the speech input unit is controlled on the basis of the detected angle and the detected distance, and incorrect operation of speech recognition is prevented.

In other words, in the related art, after configuring a speech recognition device, a separate sensor must be provided to prevent incorrect operation, and there is a problem in that providing these sensors leads to increased costs.

Through consideration of the above issues, the inventors arrived at the aspects of the present disclosure.

Hereinafter, embodiments of the present disclosure will be described with reference to the attached drawings. Note that the following embodiments are merely specific examples of the present disclosure, and do not limit the technical scope of the present disclosure.

Embodiment 1

FIG. 1 is a diagram illustrating a configuration of a speech recognition system according to Embodiment 1 of the present disclosure. The speech recognition system illustrated in FIG. 1 is equipped with equipment 1 and a server 2.

The equipment 1 includes home appliances disposed inside a home, for example. The equipment 1 is communicably connected to the server 2 via a network 3. The network 3 is the Internet, for example.

Note that the equipment 1 may include both equipment that is able to connect to the network 3 (such as a smartphone, a personal computer, or a television, for example), as well as equipment that is unable to connect to the network 3 by itself (such as lighting equipment, a washing machine, or a refrigerator, for example). Equipment that is unable to connect to the network 3 by itself may still be equipment that is able to connect to the network 3 via a home gateway. Equipment that is able to connect to the network 3 may also connect directly to the server 2 without going through a home gateway.

The server 2 is made up of a common server computer or the like, and is communicably connected to the equipment 1 via the network 3.

Figure 2:
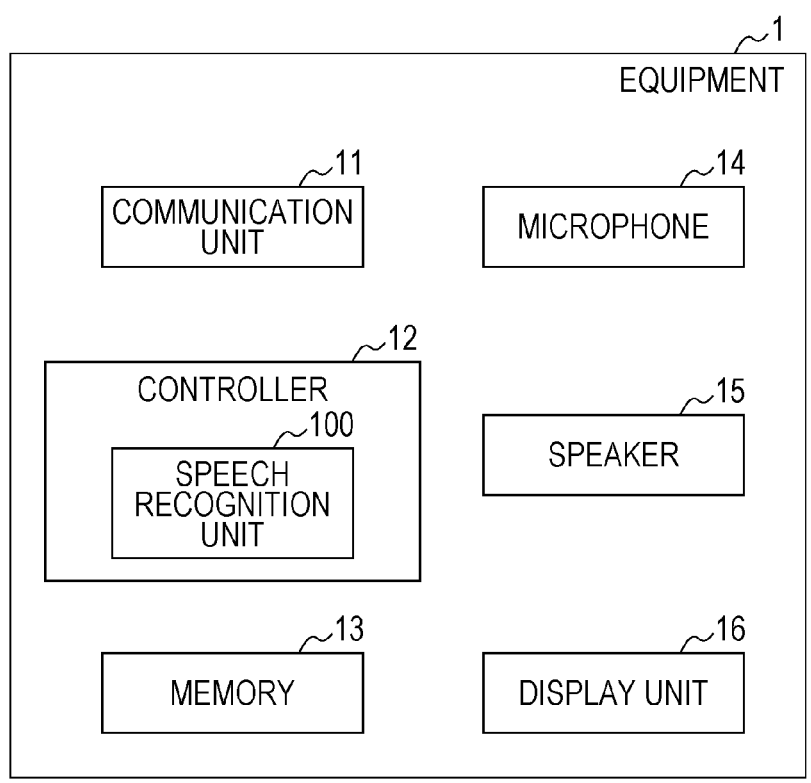
FIG. 2 is a diagram illustrating a configuration of equipment in a speech recognition system according to Embodiment 1 of the present disclosure.

FIG. 2 is a diagram illustrating a configuration of equipment in a speech recognition system according to Embodiment 1 of the present disclosure. The equipment 1 according to Embodiment 1 is equipped with a communication unit 11, a controller 12, memory 13, a microphone 14, a speaker 15, and a display unit 16. Note that the equipment 1 may only include some of the above structural elements, and may also include other structural elements.

The communication unit 11 transmits information to the server 2 via the network 3, and also receives information from the server 2 via the network 3. The controller 12 is made up of a central processing unit (CPU), for example, and controls the equipment 1 overall. The controller 12 is equipped with a speech recognition unit 100. The speech recognition unit 100 recognizes user speech. The controller 12 causes the equipment 1 to operate according to recognized speech.

The memory 13 is made up of read-only memory (ROM) or random access memory (RAM), for example, and stores information. The microphone 14 converts speech into an electrical signal, and outputs the electrical signal as speech signal. The microphone 14 is made up of a microphone array that includes two microphone units, and picks up sound in the space where the equipment 1 is disposed. The speaker 15 outputs sound. The display unit 16 is made up of a liquid crystal display device, for example, and displays various information.

Figure 3:
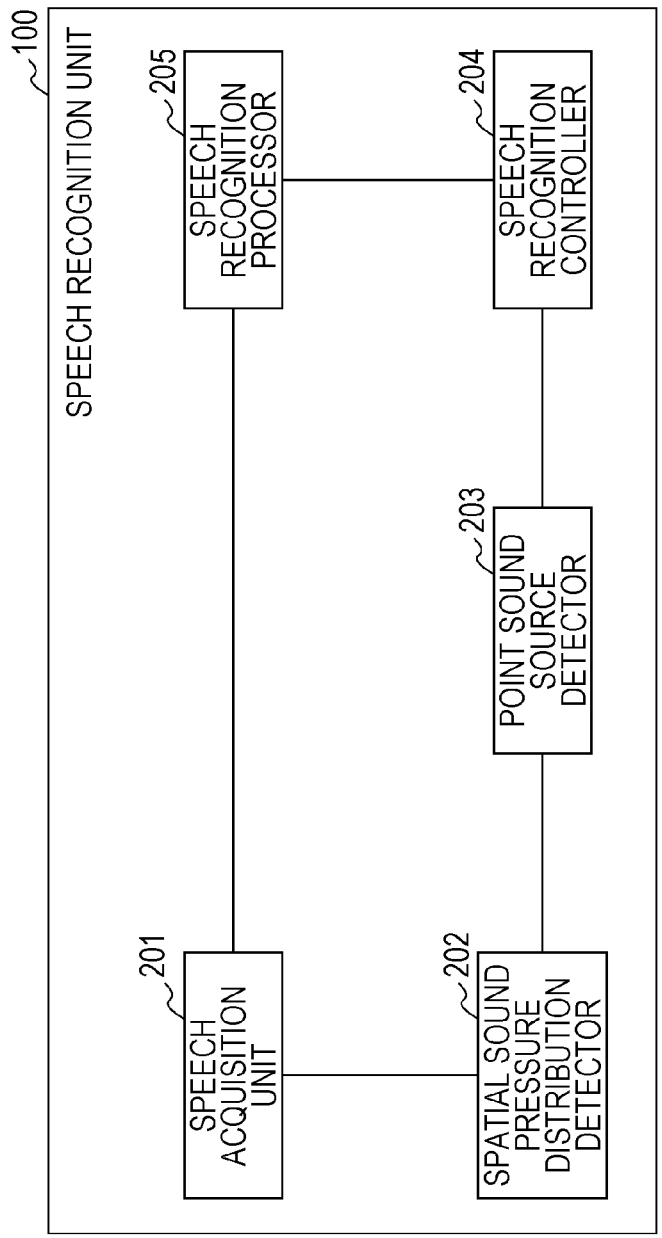
FIG. 3 is a diagram illustrating a configuration of a speech recognition unit according to Embodiment 1 of the present disclosure.

FIG. 3 is a diagram illustrating a configuration of a speech recognition unit according to Embodiment 1 of the present disclosure. The speech recognition unit 100 according to Embodiment 1 is equipped with a speech acquisition unit 201, a spatial sound pressure distribution detector 202, a point sound source detector 203, a speech recognition controller 204, and a speech recognition processor 205.

The speech acquisition unit 201 acquires speech signal from the microphone 14 disposed in a designated space. Specifically, the microphone 14 converts speech in an analog signal to speech signal in a digital signal, and the speech acquisition unit 201 acquires the speech signal converted into a digital signal from the microphone 14. Note that the designated space is preferably a room in which the equipment is disposed, for example.

The spatial sound pressure distribution detector 202 detects a spatial sound pressure distribution indicating a distribution of sound pressure in a space, on the basis of speech signal acquired by the speech acquisition unit 201. Herein, a spatial sound pressure distribution indicates a distribution of sound pressure at designated angles with reference to the position of the equipment 1 (microphone 14), for example. In addition, a spatial sound pressure distribution may also indicate a distribution of sound pressure at designated angles and designated distances with reference to the position of the equipment 1 (microphone 14). Specific examples of a spatial sound pressure distribution will be discussed later in Embodiment 1 and Embodiment 2.

The point sound source detector 203 detects a point sound source in the space on the basis of the spatial sound pressure distribution detected by the spatial sound pressure distribution detector 202. Specifically, the point sound source detector 203 first acquires an angular range of a sound source whose sound pressure is equal to or greater than a designated threshold from among the spatial sound pressure distribution detected by the spatial sound pressure distribution detector 202. Subsequently, if the width of the acquired angular range of the sound source is less than or equal to a designated width, that sound source is judged to be a point sound source in the space. The mouth of a speaking person may be treated as a point sound source, whereas equipment such as an air conditioner that produces noise has a wider sound source and more diffusion than a person's mouth, and may be treated as a plane sound source. For this reason, by detecting a point sound source in the space, it is possible to judge whether or not a sound source is speech spoken by a person.

When the point sound source detector 203 detects a point sound source, the speech recognition controller 204 judges to conduct a speech recognition process on the speech signal acquired by the speech acquisition unit 201.

When the speech recognition controller 204 judges to conduct the speech recognition process, the speech recognition processor 205 conducts the speech recognition process on the speech signal acquired by the speech acquisition unit 201.

Figure 4:
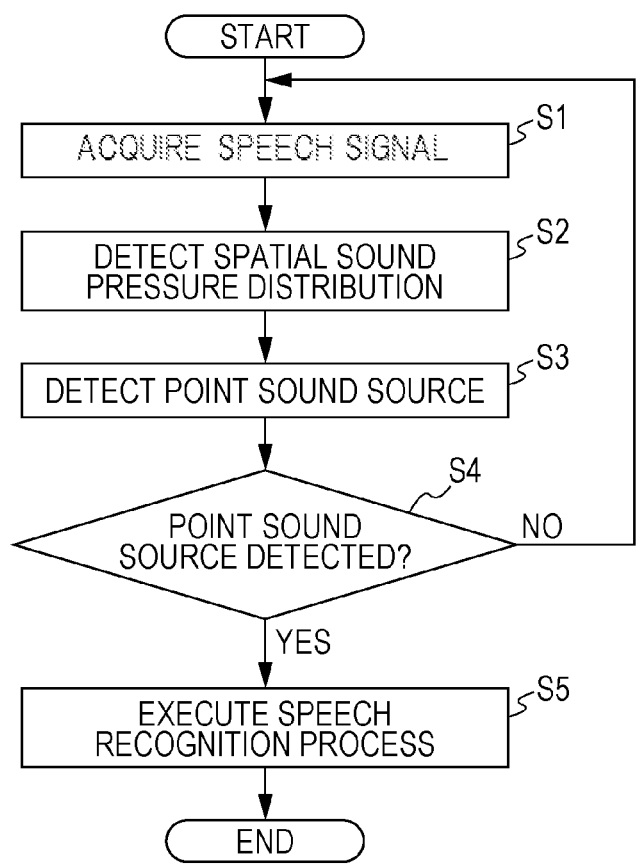
FIG. 4 is a flowchart for explaining operation of a speech recognition system according to Embodiment 1 of the present disclosure.

Operation of a speech recognition system according to Embodiment 1 of the present disclosure will now be described. FIG. 4 is a flowchart for explaining operation of a speech recognition system according to Embodiment 1 of the present disclosure.

First, in step S1, the speech acquisition unit 201 acquires speech signal from the microphone 14 provided in the equipment 1. In Embodiment 1, the microphone 14 includes two microphone units, for example, and outputs speech signal acquired from the two microphone units to the speech acquisition unit 201. Note that the number of microphone units included in the microphone 14 is not limited to two, and three or more may also be included.

Next, in step S2, the spatial sound pressure distribution detector 202 detects a spatial sound pressure distribution indicating a distribution of sound pressure in a space, on the basis of speech signal acquired by the speech acquisition unit 201.

For example, if the microphone 14 includes multiple microphone units, the pickup range may be given directionality using established beamforming technology or the like, and thus a sound pressure distribution may be detected at designated angles by sweeping (scanning) a directional beam. Furthermore, by utilizing the spherical wave characteristic of sound waves, beam control related to the distance of a sound source is also possible, and the detection of a sound pressure distribution at designated distances also becomes possible.

Figure 24A:
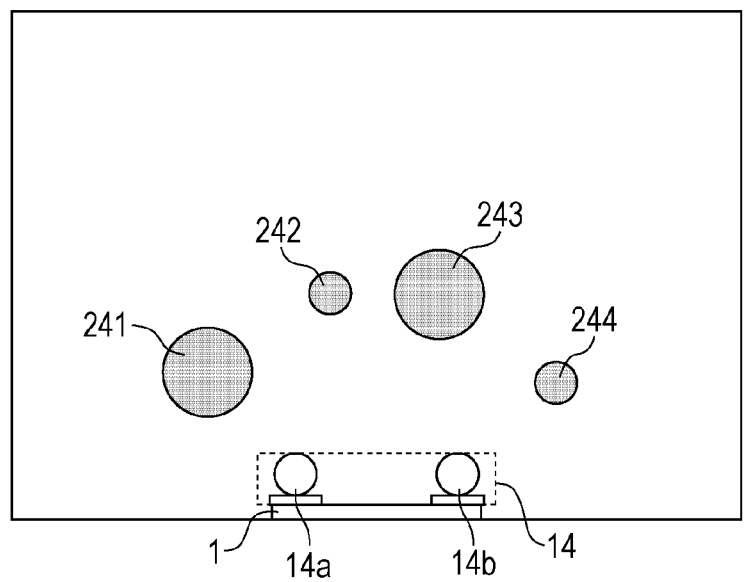
FIG. 24A is a diagram schematically illustrating a space in which equipment 1 and multiple sound sources exist, according to Embodiment 1 of the present disclosure.
Figure 24B:
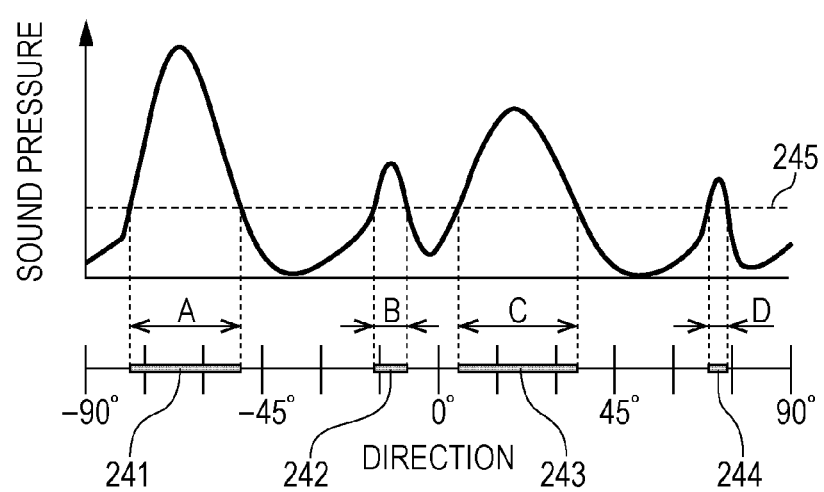
FIG. 24B is a diagram illustrating a spatial sound pressure distribution detected by a spatial sound pressure distribution detector 202, according to Embodiment 1 of the present disclosure.

FIG. 24A is a diagram schematically illustrating a space in which the equipment 1 and multiple sound sources (sound source 241, sound source 242, sound source 243, and sound source 244) exist, while FIG. 24B is a diagram illustrating a spatial sound pressure distribution detected by the spatial sound pressure distribution detector 202 in the space illustrated in FIG. 24A.

The microphone 14 of the equipment 1 illustrated in FIG. 24A includes a microphone unit 14a and a microphone unit 14b at different positions in the horizontal direction. Additionally, suppose that multiple sound sources (sound source 241, sound source 242, sound source 243, and sound source 244) exist in the space as illustrated in FIG. 24A. Since the pickup range of the microphone 14 including multiple microphone units may be given directionality as above, by sweeping (scanning) a directional beam, it is possible to detect the presence or absence of each sound source in multiple regions in the space. Consequently, a spatial sound pressure distribution as illustrated in FIG. 24B may be detected. The spatial sound pressure distribution illustrated in FIG. 24B indicates a distribution of sound pressure at respective angles from −90° to 90°, where the position of the equipment 1 is taken to be 0°.

Note that when the microphone 14 includes two microphone units at different positions in the horizontal direction, a spatial sound pressure distribution may be detected in the horizontal plane as illustrated in FIGS. 24A and 24B. In addition, when the microphone 14 includes two microphone units at different positions in the vertical direction, a spatial sound pressure distribution may be detected in the vertical plane. In addition, when the microphone 14 includes three microphone units at different positions in the horizontal and vertical directions, a distribution of sound pressure levels in a three-dimensional coordinate space taking the position of the microphone 14 as the origin may be detected.

Next, in step S3, the point sound source detector 203 detects a point sound source in the space on the basis of the spatial sound pressure distribution detected by the spatial sound pressure distribution detector 202. The width of a point sound source is narrow than the width of a plane sound source. In addition, the area of a point sound source is smaller than the area of a plane sound source. For this reason, the point sound source detector 203 first acquires an angular range of a sound source whose sound pressure is equal to or greater than a designated threshold from among the spatial sound pressure distribution detected by the spatial sound pressure distribution detector 202. Subsequently, if the width of the acquired angular range of the sound source is less than or equal to a designated width, that sound source is judged to be a point sound source in the space. Hereinafter, a specific example of the point sound source detector 203 specifying a point sound source in a space will be described using FIGS. 24A and 24B.

First, the point sound source detector 203 specifies angular ranges in which the sound pressure is equal to or greater than a threshold 245 from among the spatial sound pressure distribution illustrated in FIG. 24B. As a result, sound sources to be judged as point sound sources or not are specified. In the lower part of FIG. 24B, the sound source 241 within the range from −90° to −45°, the sound source 242 within the range from −45° to 0°, the sound source 243 within the range from 0° to 45°, and the sound source 244 within the range from 45° to 90° are specified as respective sound sources to be judged as point sound sources or not. In addition, the spatial sound pressure distribution detector 202 respectively acquires the angular range A of the sound source 241, the angular range B of the sound source 242, the angular range C of the sound source 243, and the angular range D of the sound source 244.

Subsequently, from among the widths of the angular ranges A to D for each of the sound source 241, the sound source 242, the sound source 243, and the sound source 244 specified as sound sources to process, the point sound source detector 203 specifies the sound sources having an angular range of a designated width or less, and judges the specified sound sources as point sound sources. Herein, the sound source 242 and the sound source 244 corresponding to the angular ranges B and D of the designated width or less are judged to be point sound sources, for example. As a result, a point sound source 242 and a point sound source 244 may be judged to exist within the space illustrated in FIG. 24A.

Note that the method by which the point sound source detector 203 judges whether or not a sound source is a point sound source is not limited to the method described above. The point sound source detector 203 judges whether or not a sound source is a point sound source by acquiring one or multiple pieces of information from among various information related to acquired sound sources, such as the magnitude of the sound pressure, the width of the sound pressure (in other words, the angular range of the specified sound source), the characteristics of the sound wave, and the area of the sound pressure (described in Embodiment 2).

Next, in step S4, the speech recognition controller 204 judges whether or not the point sound source detector 203 detected a point sound source. At this point, in the case of judging that a point sound source was detected (step S4, Yes), the speech recognition controller 204 judges to conduct the speech recognition process, and proceeds to the process in step S5. On the other hand, in the case of judging that a point sound source was not detected (step S4, No), the speech recognition controller 204 judges not to conduct the speech recognition process, and proceeds to the process in step S1. In the example of FIGS. 24A and 24B, the point sound source detector 203 detects the point sound source 242 and the point sound source 244, and thus proceeds to the process in step S5.

Note that in the case of detecting a sound pressure distribution at designated angles as in FIG. 24B, only a sound source positioned within a designated angular range from the microphone 14 may be judged to be a sound source for control. For example, between the sound source 242 and the sound source 244, only the sound source 242 which is the sound source positioned within a designated angular range (for example, −45° to 45°) from the microphone 14 is judged to be a sound source for control. As a result, the speech recognition device (system) is able to limit the sound source region over which to receive speech commands. Note that the designated angular range by which the speech recognition controller 204 judges a point sound source may be preset angles, or user-configured.

Next, in step S5, when the speech recognition controller 204 judges to conduct the speech recognition process, the speech recognition processor 205 conducts the speech recognition process on the speech signal acquired by the speech acquisition unit 201. Also, when the speech recognition controller 204 judges not to conduct the speech recognition process, the speech recognition processor 205 does not conduct the speech recognition process on the speech signal acquired by the speech acquisition unit 201.

In this way, a speech recognition process is conducted when a point sound source is detected, whereas a speech recognition process is not conducted when a point sound source is not detected, and thus whether or not to conduct a speech recognition process may be judged easily. In addition, a sensor for sensing the presence of a person is not needed, and thus incorrect operation of speech recognition may be prevented with a low-cost configuration.

Note that although the microphone 14 includes two microphone units in the present embodiment, the present disclosure is not particularly limited thereto, and the microphone 14 may also include three or more microphone units. In this case, the spatial sound pressure distribution detection precision may be improved. This is also applicable to the other embodiments.

In addition, in the present embodiment, a spatial sound pressure distribution is detected using a microphone 14 provided in the equipment 1, but the present disclosure is not particularly limited thereto, and the spatial sound pressure distribution detector 202 may also detect a spatial sound pressure distribution using the microphone 14 provided in the equipment 1 as well as a microphone provided in other equipment disposed within the same space as the equipment 1. In this case, the position of the microphone of the other equipment is preferably stored in advance in the spatial sound pressure distribution detector 202. This is also applicable to the other embodiments.

In addition, in the present embodiment, the equipment 1 is equipped with the speech recognition unit 100, but the present disclosure is not particularly limited thereto, and the server 2 may also be equipped with the speech recognition unit 100. In this case, speech signal acquired by the microphone 14 of the equipment 1 is transmitted to the server 2 via the network 3, and the speech recognition unit 100 of the server 2 executes the process from steps S1 to S5 of FIG. 4. Subsequently, if the speech recognition process was conducted, the server 2 transmits an operating instruction for the equipment 1 based on the speech recognition process result to the equipment 1, and the equipment 1 operates according to the operating instruction from the server 2. This is also applicable to the other embodiments.

In addition, in the present embodiment, the equipment 1 is equipped with the speech recognition unit 100, but the present disclosure is not particularly limited thereto, and the speech recognition unit 100 may also be provided in other equipment disposed within the same home as the equipment 1. In addition, a home controller that controls multiple pieces of equipment disposed within a home may also be equipped with the speech recognition unit 100. This is also applicable to the other embodiments.

Embodiment 2

Figure 5:
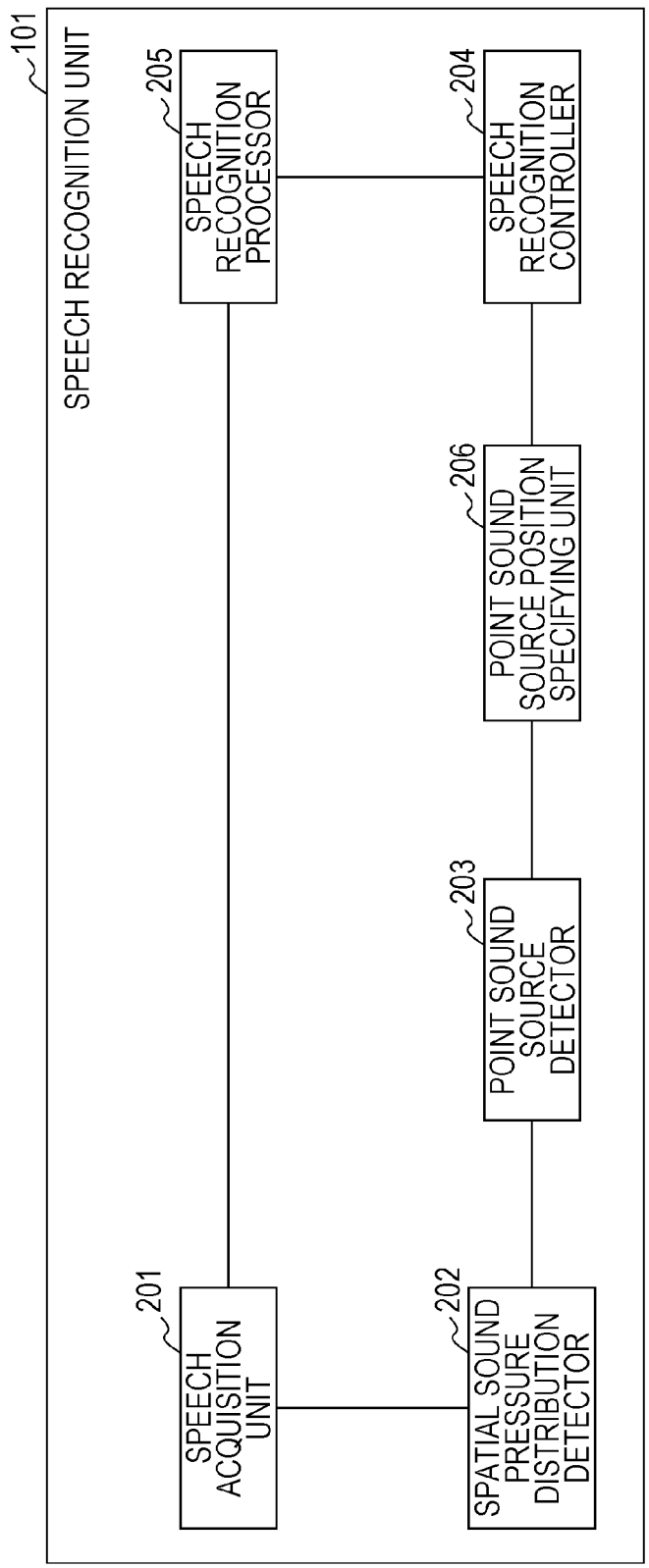
FIG. 5 is a diagram illustrating a configuration of a speech recognition unit according to Embodiment 2 of the present disclosure.

FIG. 5 is a diagram illustrating a configuration of a speech recognition unit according to Embodiment 2 of the present disclosure. The speech recognition unit 101 according to Embodiment 2 is equipped with a speech acquisition unit 201, a spatial sound pressure distribution detector 202, a point sound source detector 203, a speech recognition controller 204, a speech recognition processor 205, and a point sound source position specifying unit 206. Note that the configuration of the equipment 1 is the same as Embodiment 1, and the controller 12 is equipped with the speech recognition unit 101. In Embodiment 2, structural elements that are the same as Embodiment 1 are denoted with the same signs, and the description thereof will be reduced or omitted.

When the point sound source detector 203 detects a point sound source, the point sound source position specifying unit 206 specifies the position of the detected point sound source within the space. Note that the memory 13 stores in advance the positions of multiple microphone units included in the microphone provided in the equipment 1. The point sound source position specifying unit 206 specifies the position of a point sound source within a three-dimensional space according to a triangulation method using the positions of the multiple microphone units.

When the distance between the position of a point sound source and the equipment 1 is shorter than a designated distance, the speech recognition controller 204 judges to conduct the speech recognition process, whereas when the distance between the position of a point sound source and the equipment 1 is equal to or greater than the designated distance, the speech recognition controller 204 judges not to conduct the speech recognition process.

Figure 6:
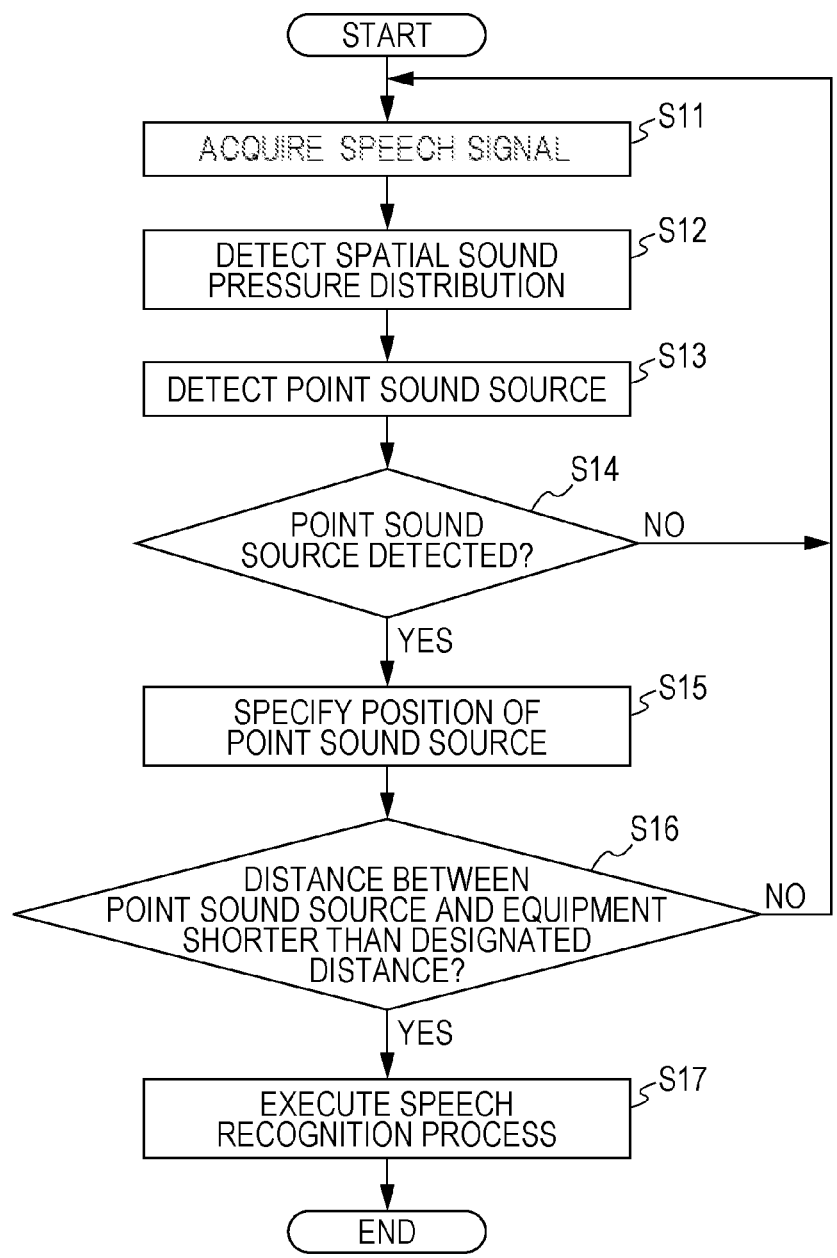
FIG. 6 is a flowchart for explaining operation of a speech recognition system according to Embodiment 2 of the present disclosure.

Operation of a speech recognition system according to Embodiment 2 of the present disclosure will now be described. FIG. 6 is a flowchart for explaining operation of a speech recognition system according to Embodiment 2 of the present disclosure.

Note that since the process from steps S11 to S14 of FIG. 6 is the same as the process from steps S1 to S4 of FIG. 4, the description will be reduced or omitted.

In the case of judging in step S14 that a point sound source was detected (step S14, Yes), in step S15 the point sound source position specifying unit 206 specifies the position within the space of the point sound source detected by the point sound source detector 203. The point sound source position specifying unit 206 specifies the position of a point sound source detected by the point sound source detector 203 from among the spatial sound pressure distribution detected by the spatial sound pressure distribution detector 202.

The spatial sound pressure distribution expresses a distribution of sound pressure levels in a two-dimensional (or three-dimensional) coordinate space taking the position of the microphone 14 as the origin, for example. The memory 13 stores in advance the positions of the multiple microphone units included in the microphone 14 provided in the equipment 1. In addition, the multiple microphone units are disposed at a designated spacing. The time until speech output from a point sound source reaches each microphone unit is different for each microphone unit. For this reason, the point sound source position specifying unit 206 specifies the position of a point sound source (the distance from the microphone 14) within a two-dimensional (or three-dimensional) space on the basis of the position of each of the multiple microphone units, and the time for speech from a detected point sound source to reach the multiple microphone units.

Herein, the method of specifying the position of a point sound source (the distance from the microphone 14) is not limited to the above. For example, the position of a point sound source may also be specified by using the characteristics of how sound waves propagate, for example. For example, by utilizing the spherical wave characteristic of sound propagation, a sound pressure distribution in the distance direction may be measured, and consequently used to specify the position of a point sound source (the distance from the microphone 14).

At this point, if the position of a point sound source is specified in step S15, the spatial sound pressure distribution detector may also update the sound pressure distribution detected in step S12 to a distribution that indicates the sound pressure distribution for designated angles and designated distances with reference to the equipment 1.

Figure 25A:
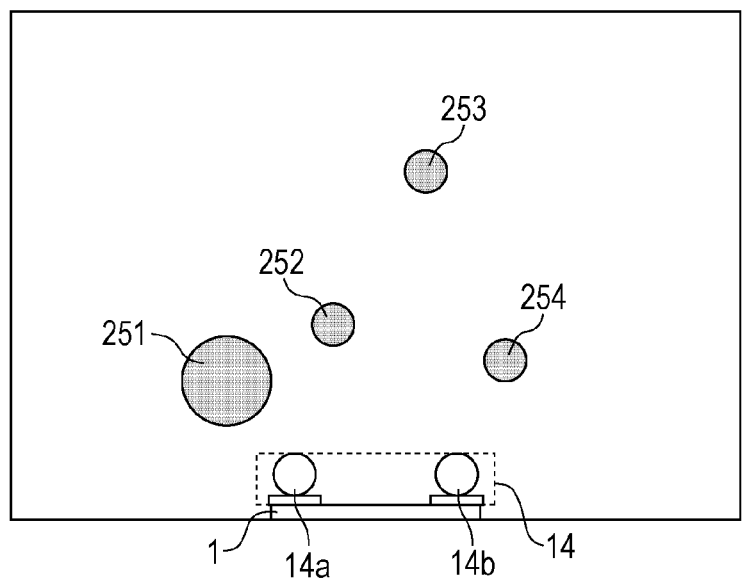
FIG. 25A is a diagram schematically illustrating a space in which equipment 1 and multiple sound sources exist, according to Embodiment 2 of the present disclosure.
Figure 25B:
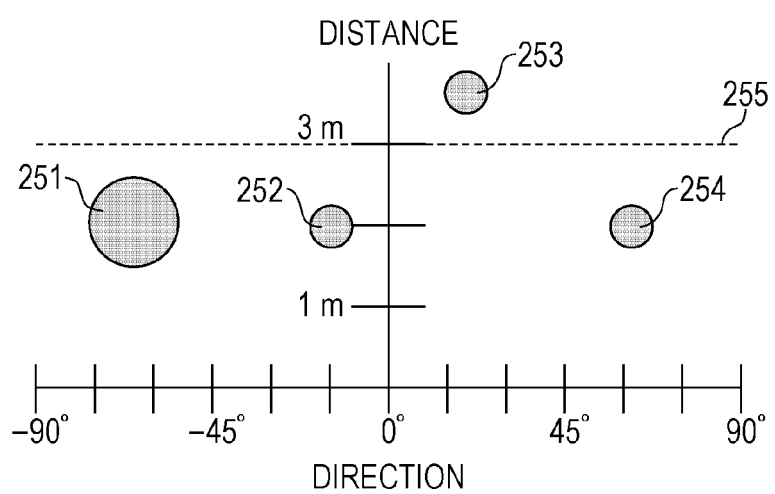
FIG. 25B is a diagram illustrating a spatial sound pressure distribution detected by a spatial sound pressure distribution detector 202, according to Embodiment 2 of the present disclosure.

FIG. 25A is a diagram schematically illustrating a space in which the equipment 1 and multiple sound sources (sound source 251, sound source 252, sound source 253, and sound source 254) exist, while FIG. 25B is a diagram illustrating a spatial sound pressure distribution at respective distances and angles detected by the spatial sound pressure distribution detector 202 in the space illustrated in FIG. 25A. In the spatial sound pressure distribution illustrated in FIG. 25B, a two-dimensional coordinate grid is constructed by treating the position of the equipment 1 as the origin, while taking the angle as the horizontal axis and the distance as the vertical axis. Detected sound sources are placed in the coordinate grid, and the area of each sound source (the width of the angular range and the width in the depth direction) is expressed by the size of the circle.

Since the position (distance) of a sound source is specified in step S15, the width of each sound source in the depth direction from the perspective of the equipment 1 may be detected. Consequently, in step S13, the area of each sound source may be computed by accounting for the width of the angular range of each sound source described in Embodiment 1, as well as the width in the depth direction. As a result, a sound source whose area is less than a designated threshold may be specified as a point sound source.

In the example illustrated in FIG. 25B, suppose that the sound source 251 within the range from −90° to −45°, the sound source 252 within the range from −45° to 0°, the sound source 253 within the range from 0° to 45°, and the sound source 254 within the range from 45° to 90° are detected as respective sound sources, and of these sound sources, the sound source 252, the sound source 253, and the sound source 254 which are smaller than a designated area are specified as point sound sources.

Next, in step S16, the speech recognition controller 204 judges whether or not the distance between the position of a point sound source and the equipment 1 is shorter than a designated distance. The speech recognition controller 204 stores in advance the position of the equipment 1 within the three-dimensional coordinate space taking the position of the microphone 14 as the origin. For this reason, the speech recognition controller 204 is able to compute the distance between the positional coordinates of a point sound source specified by the point sound source position specifying unit 206, and the positional coordinates of the equipment 1, and judge whether or not the computed distance is shorter than a designated distance.

At this point, FIG. 25B will be used to describe an example of the speech recognition controller 204 judging whether or not the distance between the position of a point sound source and the equipment 1 is shorter than a designated distance.

In the example of FIG. 25B, suppose that the point sound source detector 203 judges that the sound source 252, the sound source 253, and the sound source 254 are point sound sources, as described above. In this case, among the point sound source 252, the point sound source 253, and the point sound source 254, the point sound source 252 and the point sound source 254 positioned within a threshold 255 which is a designated distance (in this case, 3 m) are judged to be sound sources whose distance from the equipment 1 lies within the designated range.

Note that the designated distance is preferably a range at which the user is able to operate the equipment 1, for example. For example, if the equipment 1 is a television, the designated distance is preferably the range at which the user is able to watch the television. Also, when considering the detection sensitivity of the microphone units, the designated distance is preferably 3×, 4×, or 5× the distance from the microphone unit at one end to the microphone unit at the other end of the multiple microphone units.

At this point, in the case of judging that the distance between the position of a point sound source and the equipment 1 is shorter than the designated distance (step S16, Yes), the speech recognition controller 204 judges to conduct the speech recognition process, and proceeds to the process in step S17. On the other hand, in the case of judging that the distance between the position of a point sound source and the equipment 1 is not shorter than the designated distance (step S16, No), the speech recognition controller 204 judges not to conduct the speech recognition process, and returns to the process in step S11.

Next, in step S17, when the speech recognition controller 204 judges to conduct the speech recognition process, the speech recognition processor 205 conducts the speech recognition process on the speech signal acquired by the speech acquisition unit 201. Also, when the speech recognition controller 204 judges not to conduct the speech recognition process, the speech recognition processor 205 does not conduct the speech recognition process on the speech signal acquired by the speech acquisition unit 201.

In this way, when a point sound source is detected, it is judged whether or not the distance between the position of the point sound source and the equipment 1 is shorter than the designated distance. Subsequently, in the case of judging that the distance between the position of the point sound source and the equipment 1 is shorter than the designated distance, the speech recognition process is conducted, whereas in the case of judging that the distance between the position of the point sound source and the equipment 1 is not shorter than the designated distance, the speech recognition process is not conducted. Consequently, by judging whether or not the distance between the position of a point sound source and the equipment 1 is shorter than a designated distance, it is possible to judge whether the user is speaking near the equipment 1 in order to operate the equipment 1, or whether the user is speaking away from the equipment 1 in a manner unrelated to the operation of the equipment 1, and incorrect operation of speech recognition may be prevented with a low-cost configuration.

In addition, the speaker's position may be specified without using a costly device, and the speech recognition process may be controlled on the basis of the speaker's position.

Embodiment 3

Figure 7:
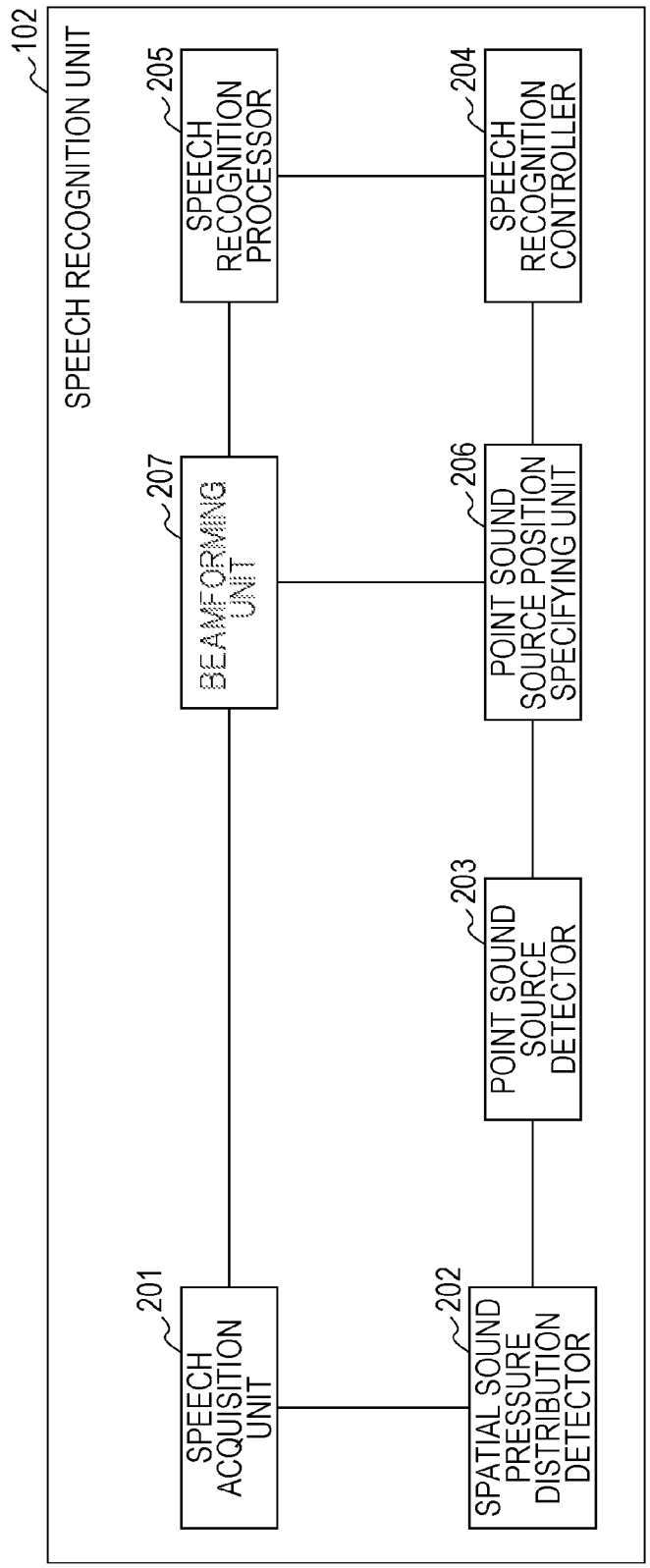
FIG. 7 is a diagram illustrating a configuration of a speech recognition unit according to Embodiment 3 of the present disclosure.

FIG. 7 is a diagram illustrating a configuration of a speech recognition unit according to Embodiment 3 of the present disclosure. The speech recognition unit 102 according to Embodiment 3 is equipped with a speech acquisition unit 201, a spatial sound pressure distribution detector 202, a point sound source detector 203, a speech recognition controller 204, a speech recognition processor 205, a point sound source position specifying unit 206, and a beamforming unit 207. Note that the configuration of the equipment 1 is the same as Embodiment 1, and the controller 12 is equipped with the speech recognition unit 102. In Embodiment 3, structural elements that are the same as Embodiment 1 and Embodiment 2 are denoted with the same signs, and the description thereof will be reduced or omitted.

The beamforming unit 207 controls the directionality of the microphone 14 to point towards the position of a point sound source specified by the point sound source position specifying unit 206. The beamforming unit 207 performs signal processing on speech signal acquired by the speech acquisition unit 201 to raise the sensitivity in the direction facing the position of a point sound source specified by the point sound source position specifying unit 206. Consequently, the directionality of the microphone 14 is controlled in the direction pointing towards the point sound source.

In this way, by controlling the directionality of the microphone 14 to point towards the position of a point sound source, speech signal may be acquired reliably from the point sound source, and incorrect operation of speech recognition may be prevented.

Embodiment 4

Figure 8:
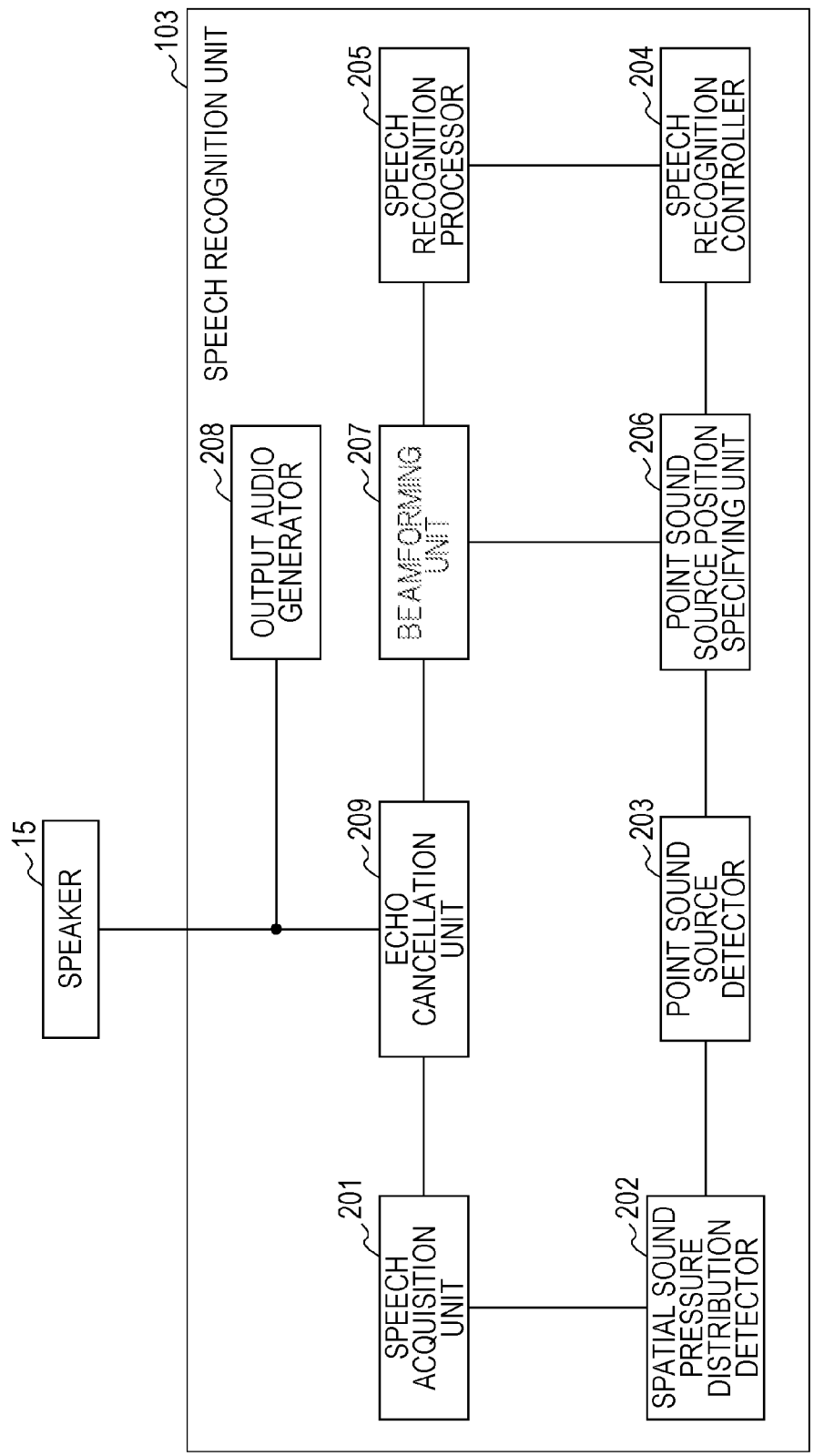
FIG. 8 is a diagram illustrating a configuration of a speech recognition unit according to Embodiment 4 of the present disclosure.

FIG. 8 is a diagram illustrating a configuration of a speech recognition unit according to Embodiment 4 of the present disclosure. The speech recognition unit 103 according to Embodiment 4 is equipped with a speech acquisition unit 201, a spatial sound pressure distribution detector 202, a point sound source detector 203, a speech recognition controller 204, a speech recognition processor 205, a point sound source position specifying unit 206, a beamforming unit 207, an output audio generator 208, and an echo cancellation unit 209. Note that the configuration of the equipment 1 is the same as Embodiment 1, and the controller 12 is equipped with the speech recognition unit 103. In Embodiment 4, structural elements that are the same as Embodiment 1 to Embodiment 3 are denoted with the same signs, and the description thereof will be reduced or omitted.

The output audio generator 208 generates output audio information to be output from the speaker 15 of the equipment 1. The output audio generator 208 generates output audio information for prompting the user to perform an operation, output audio information for responding to a user operation, or the like, and outputs to the speaker 15 and the echo cancellation unit 209. The output audio generator 208 reads out output audio information corresponding to the operational status of the equipment 1 from the memory 13, and generates output audio information. Alternatively, the output audio generator 208 may also read out multiple pieces of audio information corresponding to the operational status of the equipment 1 from the memory 13, and generate output audio information by combining the multiple pieces of audio information that were read out. Note that when the equipment 1 is a television, a radio, or audio equipment for music playback or the like, the output audio information generated by the output audio generator 208 may include audio information from received broadcast content, or audio information from recorded content (recorded video or recorded audio).

The speaker 15 outputs the output audio information generated by the output audio generator 208 as output audio.

The echo cancellation unit 209 acquires output audio information generated by the output audio generator 208, and cancels an echo component made up of the acquired output audio information from the speech signal acquired by the speech acquisition unit 201.

In other words, when audio is output from the speaker 15, the speech signal acquired by the speech acquisition unit 201 includes not only the speech spoken by the user, but also an echo component made up of the audio output from the speaker 15. For this reason, when speech recognition is conducted on the basis of speech signal that includes an echo component, there is a risk that the speech recognition may not be conducted accurately. Accordingly, the echo component made up of output audio information generated by the output audio generator 208 is removed from the speech signal acquired by the speech acquisition unit 201. As a result, speech signal may be acquired reliably from a point sound source, and incorrect operation of speech recognition may be prevented.

Embodiment 5

Figure 9:
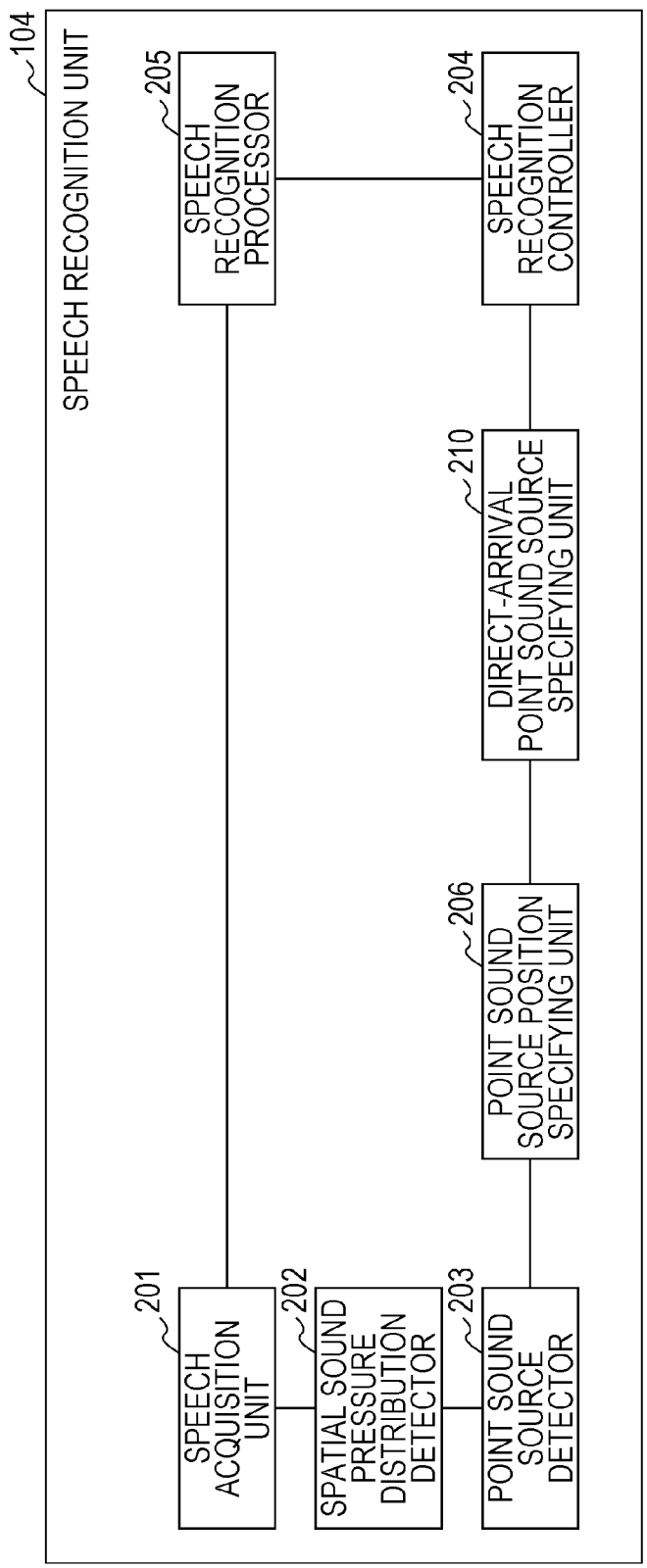
FIG. 9 is a diagram illustrating a configuration of a speech recognition unit according to Embodiment 5 of the present disclosure.

FIG. 9 is a diagram illustrating a configuration of a speech recognition unit according to Embodiment 5 of the present disclosure. The speech recognition unit 104 according to Embodiment 5 is equipped with a speech acquisition unit 201, a spatial sound pressure distribution detector 202, a point sound source detector 203, a speech recognition controller 204, a speech recognition processor 205, a point sound source position specifying unit 206, and a direct-arrival point sound source specifying unit 210. Note that the configuration of the equipment 1 is the same as Embodiment 1, and the controller 12 is equipped with the speech recognition unit 104. In Embodiment 5, structural elements that are the same as Embodiment 1 to Embodiment 4 are denoted with the same signs, and the description thereof will be reduced or omitted.

The direct-arrival point sound source specifying unit 210 specifies a direct-arrival point sound source from which emitted sound directly arrives at the microphone 14 from among the point sound sources whose positions are specified by the point sound source position specifying unit 206. Note that it is possible to use an established method to specify a direct-arrival point sound source from which emitted sound directly arrives at the microphone 14 from among the point sound sources whose positions are specified by the point sound source position specifying unit 206. A method of specifying a direct-arrival point sound source will be discussed later using FIGS. 26A and 26B. When the direct-arrival point sound source specifying unit 210 specifies a direct-arrival point sound source, the speech recognition controller 204 judges to conduct the speech recognition process, whereas when the direct-arrival point sound source specifying unit 210 does not specify a direct-arrival point sound source, the speech recognition controller 204 judges not to conduct the speech recognition process.

Figure 10:
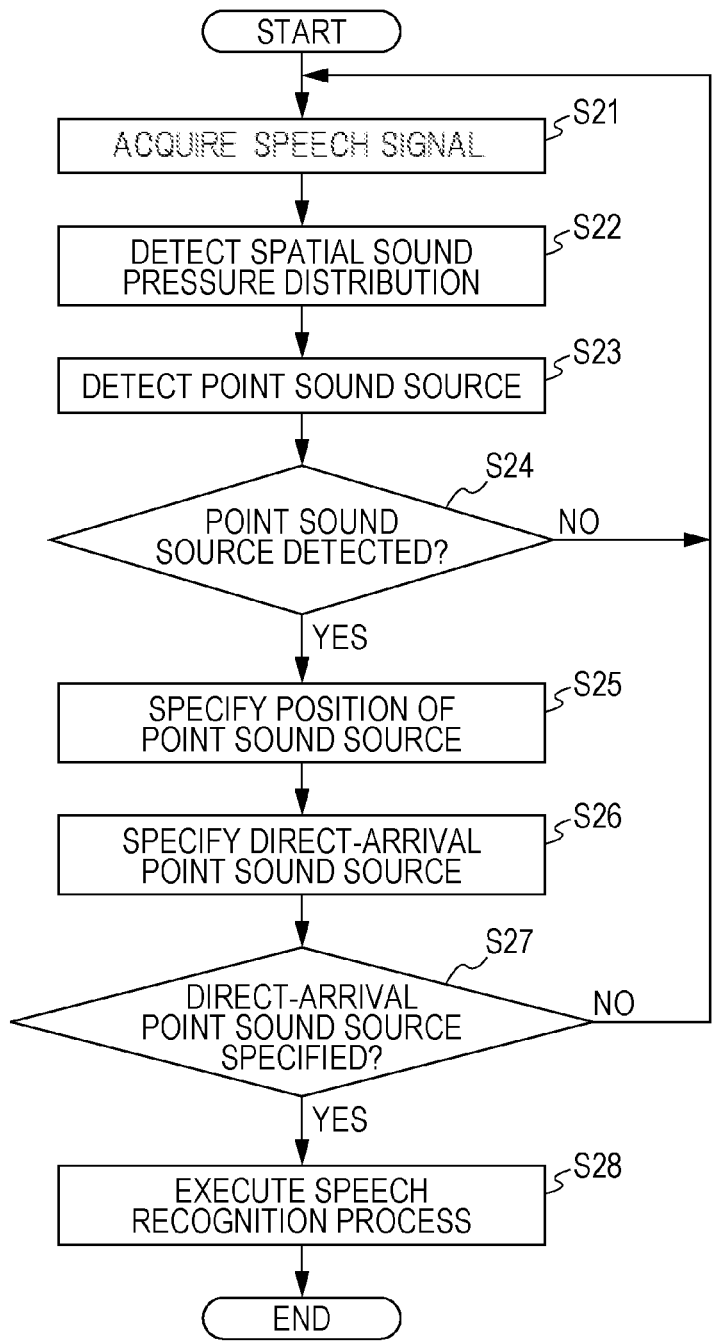
FIG. 10 is a flowchart for explaining operation of a speech recognition system according to Embodiment 5 of the present disclosure.

Operation of a speech recognition system according to Embodiment 5 of the present disclosure will now be described. FIG. 10 is a flowchart for explaining operation of a speech recognition system according to Embodiment 5 of the present disclosure.

Note that since the process from steps S21 to S25 of FIG. 10 is the same as the process from steps S11 to S15 of FIG. 6, the description will be reduced or omitted.

In step S26, the direct-arrival point sound source specifying unit 210 specifies a direct-arrival point sound source from which emitted sound directly arrives at the microphone 14 from among the point sound sources whose positions are specified by the point sound source position specifying unit 206.

Next, in step S27, the speech recognition controller 204 judges whether or not the direct-arrival point sound source specifying unit 210 specified a direct-arrival point sound source.

Speech arriving at the microphone 14 from a point sound source includes not only speech that arrives at the microphone 14 directly, but also speech that arrives at the microphone 14 after reflecting off a wall or the like, or speech that arrives at the microphone 14 after passing through a wall or the like.

Ordinarily, the user operates equipment while facing in the direction of the equipment. For this reason, there is a high likelihood that speech that arrives at the microphone 14 after reflecting off a wall or the like, or speech that arrives at the microphone 14 after passing through a wall or the like, is speech that was emitted while the user was not facing in the direction of the equipment, and there is a high likelihood that such speech is not an operating instruction directed at the equipment. Accordingly, the speech recognition processor 205 according to Embodiment 5 conducts speech recognition when emitted speech arrives at the microphone 14 directly, and does not conduct speech recognition when emitted speech does not arrive at the microphone 14 directly.

Figure 26A:
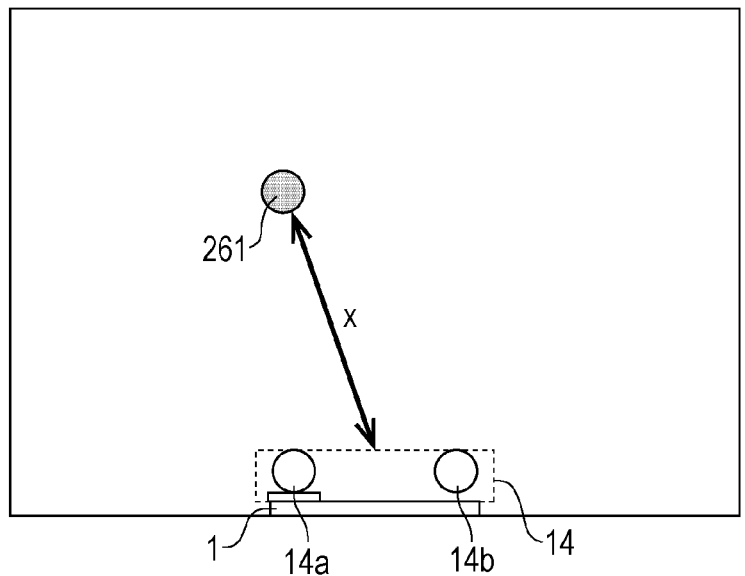
FIG. 26A is a diagram schematically illustrating a sound source in a space measured at a time t, according to Embodiment 5 of the present disclosure.
Figure 26B:
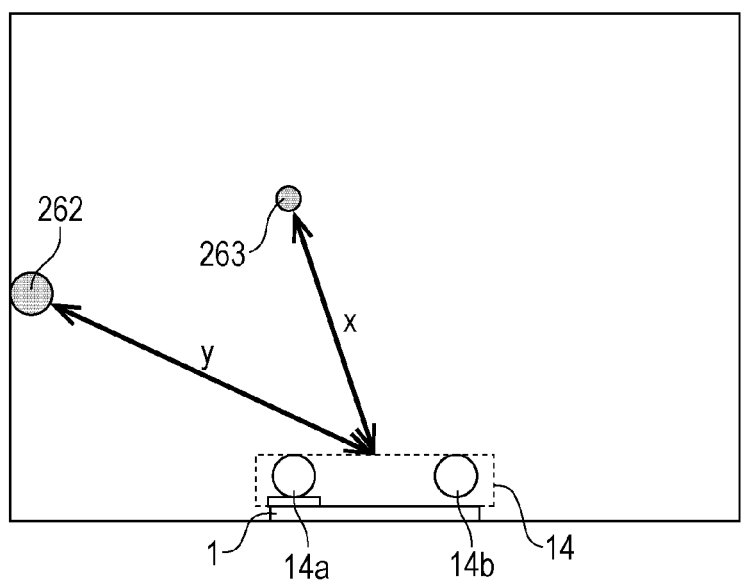
FIG. 26B is a diagram schematically illustrating a sound source in a space measured at a time t+1, according to Embodiment 5 of the present disclosure.

Hereinafter, FIGS. 26A and 26B will be used to describe a method by which the direct-arrival point sound source specifying unit 210 judges whether a sound is direct-arrival sound or not direct-arrival sound (reflected sound). FIGS. 26A and 26B are diagrams schematically illustrating a sound source in a space measured at a time t, and a sound source in a space measured at a time t+1.

In the example of FIGS. 26A and 26B, the point sound source detector 203 detects a point sound source 261 at time t. Also, at time t, the point sound source position specifying unit 206 specifies that the point sound source 261 is at a position a distance x from the equipment 1. Also, at time t+1, the point sound source detector 203 detects a point sound source 262 and a point sound source 263, respectively. Also, at time t+1, the point sound source position specifying unit 206 specifies that the point sound source 262 is at a position a distance y from the equipment 1, and the point sound source 263 is at a position a distance x from the equipment 1. In addition, the point sound source position specifying unit 206 specifies that the point sound source 261 and the point sound source 263 exist at the same position (in two-dimensional coordinates).

In this case, first the direct-arrival point sound source specifying unit 210 judges that the point sound source 261 and the point sound source 263 produced at different times at the same position (in two-dimensional coordinates) are sounds emitted from the same sound source.

Subsequently, from among the sound sources detected at different times, the direct-arrival point sound source specifying unit 210 compares the sound characteristics between the point sound source 261 and the point sound source 262 that were not judged to be sounds emitted from the same sound source. Herein, sound characteristics are not particularly limited, and include the correlation or independence between speech when the directionality is pointing towards the point sound source 261 at time t and the speech when the directionality is pointed towards the point sound source 262 or the point sound source 263 at time t+1, for example. Subsequently, in the case of judging that the point sound source 261 and the point sound source 262 have approximately the same sound characteristics, the direct-arrival point sound source specifying unit 210 judges that the point sound source 262 is not a direct-arrival sound source, or in other words, is a reflected sound source produced due to the reflection of the point sound source 261 off a wall. Additionally, the sound source 261 and the sound source 263 have a high likelihood of not being a sound source emitted towards the equipment 1, and thus are judged not to be a direct-arrival sound source.

In other words, when multiple sound sources having approximately the same characteristics are detected from among multiple sound sources detected at different times and at different detection positions (detection regions in the sound source distribution), the direct-arrival point sound source specifying unit 210 judges that the sound from at least the sound source detected at a later time is not direct-arrival sound.

Herein, a conceivable method of judging whether or not the sound characteristics are approximately the same is to compare values indicating the sound characteristics of multiple sound sources, and judge the sound sources as approximately equal when the agreement between each of the values is equal to or greater than a designated threshold, for example.

Note that the method of specifying a direct-arrival sound source is not limited to the above. For example, when multiple sound sources with approximately the same sound characteristics are specified at the same time, the sound from a sound source that is distant from the equipment may be judged not to be direct-arrival sound.

In other words, when multiple sound sources that are chronologically different (or chronologically the same) exist, the direct-arrival point sound source specifying unit 210 may judge whether or not there is direct-arrival sound on the basis of factors such as the distance of each sound source to the equipment 1, the position, and the sound characteristics.

At this point, in the case of judging that the direct-arrival point sound source specifying unit 210 specified a direct-arrival point sound source (step S27, Yes), the speech recognition controller 204 judges to conduct the speech recognition process, and proceeds to the process in step S28. On the other hand, in the case of judging that the direct-arrival point sound source specifying unit 210 did not specify a direct-arrival point sound source (step S27, No), the speech recognition controller 204 judges not to conduct the speech recognition process, and returns to the process in step S21.

Next, in step S28, when the speech recognition controller 204 judges to conduct the speech recognition process, the speech recognition processor 205 conducts the speech recognition process on the speech signal acquired by the speech acquisition unit 201. Also, when the speech recognition controller 204 judges not to conduct the speech recognition process, the speech recognition processor 205 does not conduct the speech recognition process on the speech signal acquired by the speech acquisition unit 201.

In this way, when emitted speech arrives at the microphone 14 directly, speech recognition is conducted, whereas when emitted speech does not arrive at the microphone 14 directly, speech recognition is not conducted. For this reason, it is possible to judge whether the user is speaking in the direction of the equipment 1 in order to operate the equipment 1, or whether the user is speaking in a different direction from the equipment 1 in a manner unrelated to the operation of the equipment 1, and incorrect operation of speech recognition may be prevented with a low-cost configuration.

Embodiment 6

Figure 11:
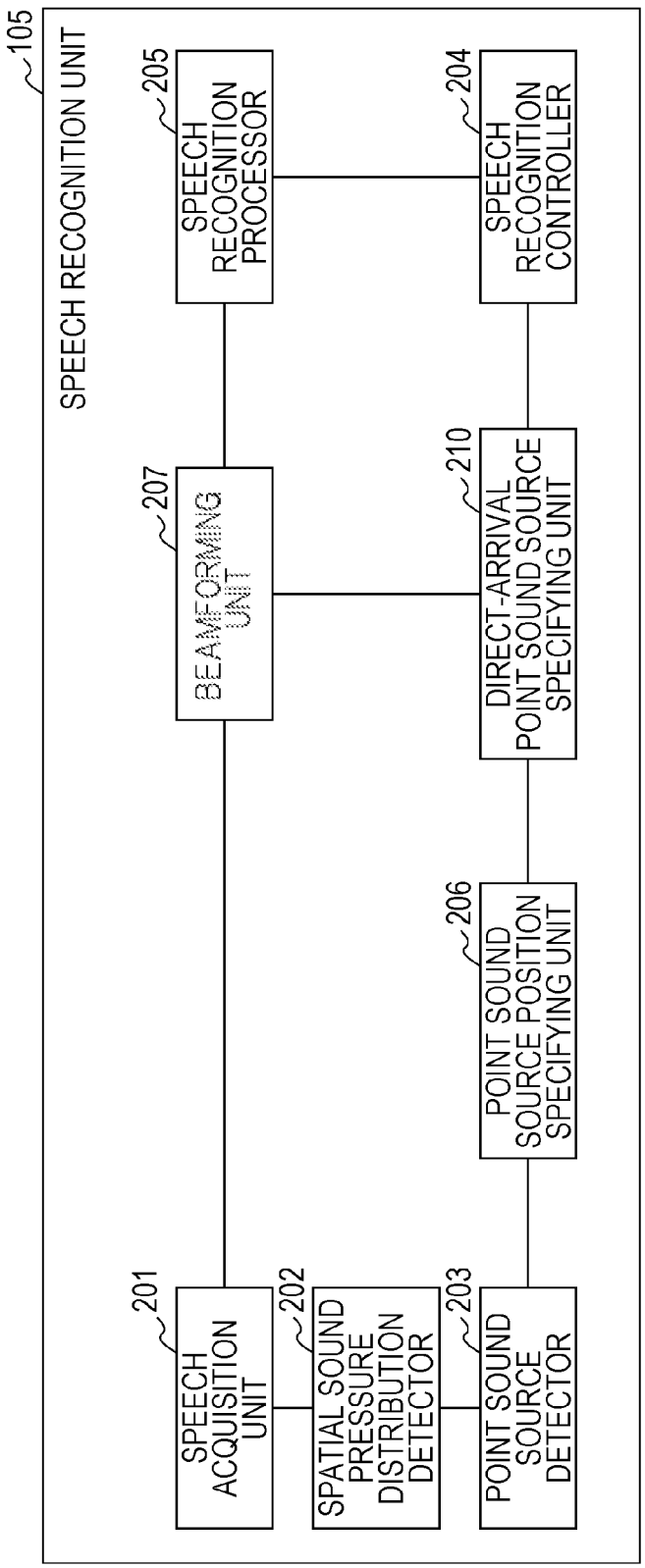
FIG. 11 is a diagram illustrating a configuration of a speech recognition unit according to Embodiment 6 of the present disclosure.

FIG. 11 is a diagram illustrating a configuration of a speech recognition unit according to Embodiment 6 of the present disclosure. The speech recognition unit 105 according to Embodiment 6 is equipped with a speech acquisition unit 201, a spatial sound pressure distribution detector 202, a point sound source detector 203, a speech recognition controller 204, a speech recognition processor 205, a point sound source position specifying unit 206, a beamforming unit 207, and a direct-arrival point sound source specifying unit 210. Note that the configuration of the equipment 1 is the same as Embodiment 1, and the controller 12 is equipped with the speech recognition unit 105. In Embodiment 6, structural elements that are the same as Embodiment 1 to Embodiment 5 are denoted with the same signs, and the description thereof will be reduced or omitted.

The direct-arrival point sound source specifying unit 210 specifies a direct-arrival point sound source from which emitted sound directly arrives at the microphone 14 from among the point sound sources whose positions are specified by the point sound source position specifying unit 206.

When the direct-arrival point sound source specifying unit 210 specifies a direct-arrival point sound source, the beamforming unit 207 controls the directionality of the microphone 14 to point towards the position of a point sound source specified by the point sound source position specifying unit 206.

In this way, since the directionality of the microphone 14 is controlled to point towards the position of a direct-arrival point sound source from which emitted speech arrives at the microphone 14 directly, speech signal may be acquired reliably from the point sound source, and incorrect operation of speech recognition may be prevented.

Embodiment 7

Figure 12:
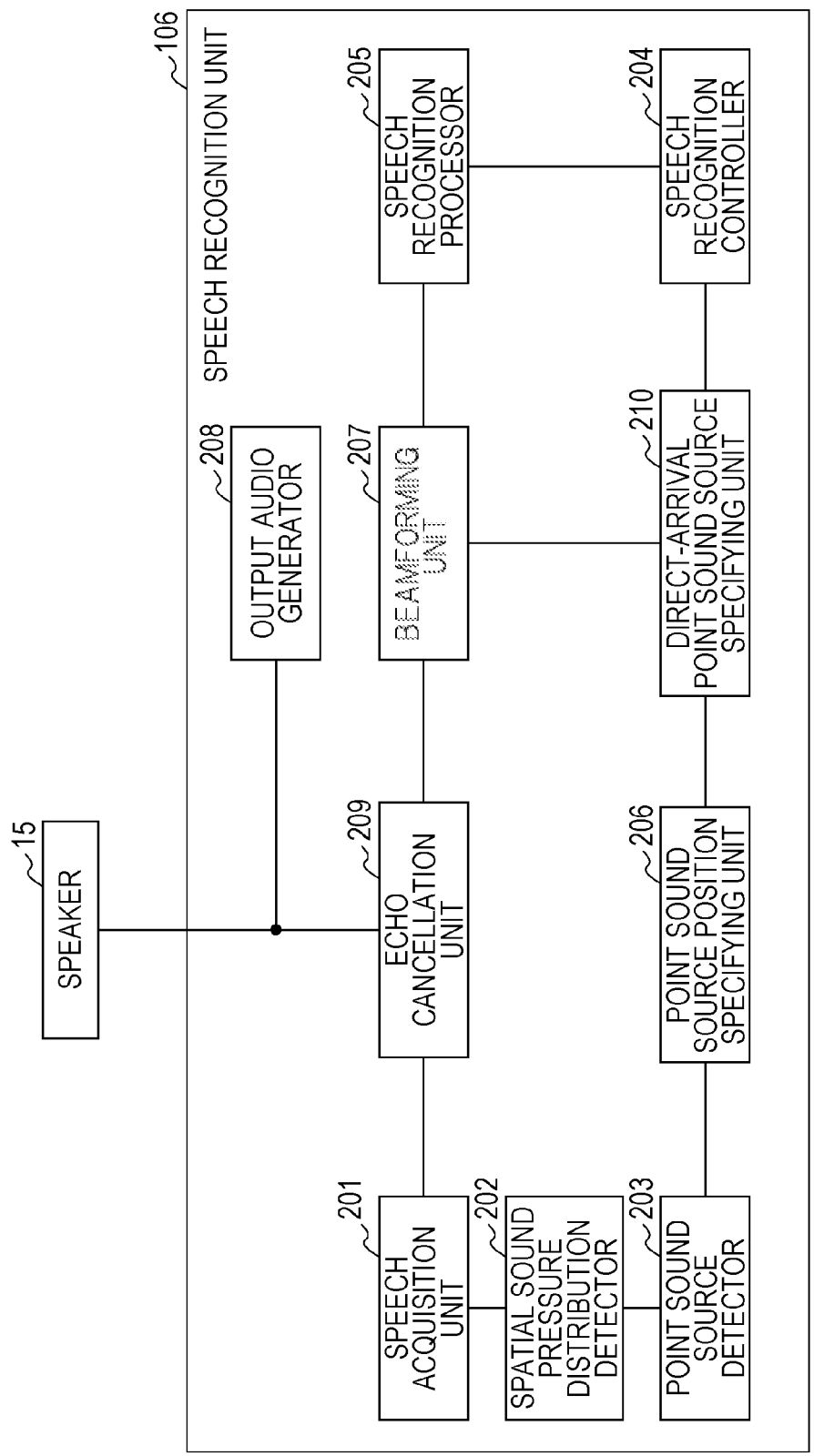
FIG. 12 is a diagram illustrating a configuration of a speech recognition unit according to Embodiment 7 of the present disclosure.

FIG. 12 is a diagram illustrating a configuration of a speech recognition unit according to Embodiment 7 of the present disclosure. The speech recognition unit 106 according to Embodiment 7 is equipped with a speech acquisition unit 201, a spatial sound pressure distribution detector 202, a point sound source detector 203, a speech recognition controller 204, a speech recognition processor 205, a point sound source position specifying unit 206, a beamforming unit 207, an output audio generator 208, an echo cancellation unit 209, and a direct-arrival point sound source specifying unit 210. Note that the configuration of the equipment 1 is the same as Embodiment 1, and the controller 12 is equipped with the speech recognition unit 106. In Embodiment 7, structural elements that are the same as Embodiment 1 to Embodiment 6 are denoted with the same signs, and the description thereof will be reduced or omitted.

The echo cancellation unit 209 acquires output audio information generated by the output audio generator 208, and cancels an echo component made up of the acquired output audio information from the speech signal acquired by the speech acquisition unit 201.

The direct-arrival point sound source specifying unit 210 specifies a direct-arrival point sound source from which emitted sound directly arrives at the microphone 14 from among the point sound sources whose positions are specified by the point sound source position specifying unit 206.

When the direct-arrival point sound source specifying unit 210 specifies a direct-arrival point sound source, the beamforming unit 207 controls the directionality of the microphone 14 to point towards the position of a point sound source specified by the point sound source position specifying unit 206.

In this way, since the directionality of the microphone 14 is controlled to point towards the position of a direct-arrival point sound source from which emitted speech arrives at the microphone 14 directly, speech signal may be acquired reliably from the point sound source, and incorrect operation of speech recognition may be prevented.

In addition, since the echo component made up of output audio information generated by the output audio generator 208 is removed from the speech signal acquired by the speech acquisition unit 201, speech signal may be acquired reliably from the point sound source, and incorrect operation of speech recognition may be prevented.

Embodiment 8

Figure 13:
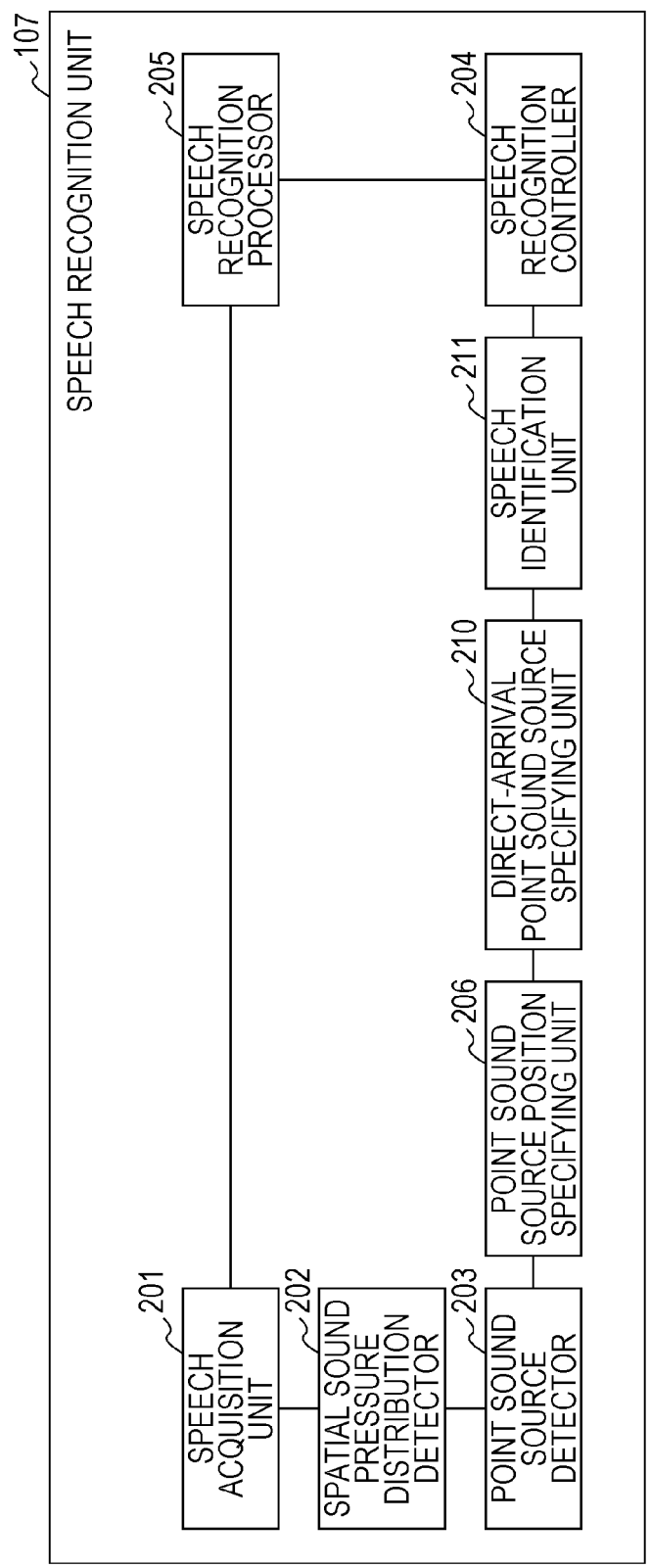
FIG. 13 is a diagram illustrating a configuration of a speech recognition unit according to Embodiment 8 of the present disclosure.

FIG. 13 is a diagram illustrating a configuration of a speech recognition unit according to Embodiment 8 of the present disclosure. The speech recognition unit 107 according to Embodiment 8 is equipped with a speech acquisition unit 201, a spatial sound pressure distribution detector 202, a point sound source detector 203, a speech recognition controller 204, a speech recognition processor 205, a point sound source position specifying unit 206, a direct-arrival point sound source specifying unit 210, and a speech identification unit 211. Note that the configuration of the equipment 1 is the same as Embodiment 1, and the controller 12 is equipped with the speech recognition unit 107. In Embodiment 8, structural elements that are the same as Embodiment 1 to Embodiment 7 are denoted with the same signs, and the description thereof will be reduced or omitted.

When the direct-arrival point sound source specifying unit 210 specifies a direct-arrival point sound source, the speech identification unit 211 identifies whether or not the directly arriving sound is speech spoken by a person.

When the speech identification unit 211 identifies that directly arriving sound is speech spoken by a person, the speech recognition controller 204 judges to conduct the speech recognition process, whereas when the speech identification unit 211 identifies that directly arriving sound is not speech spoken by a person, the speech recognition controller 204 judges not to conduct the speech recognition process.

A person's mouth is a point sound source, but among noises, there exist noises which are also point sound sources. For this reason, by identifying whether or not directly arriving sound is speech spoken by a person, the speech recognition process is prevented from being conducted on noise emitted from equipment that is not a person.

Figure 14:
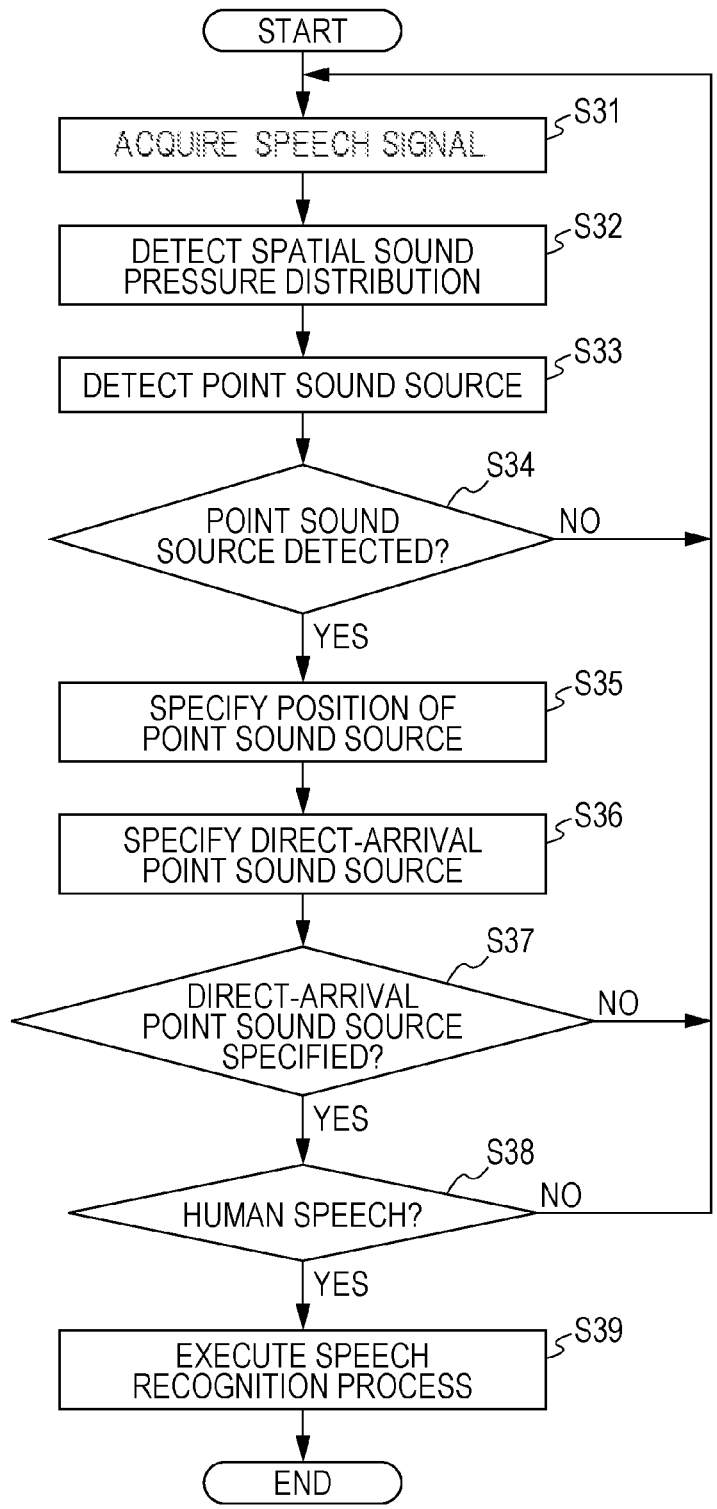
FIG. 14 is a flowchart for explaining operation of a speech recognition system according to Embodiment 8 of the present disclosure.

Operation of a speech recognition system according to Embodiment 8 of the present disclosure will now be described. FIG. 14 is a flowchart for explaining operation of a speech recognition system according to Embodiment 8 of the present disclosure.

Note that since the process from steps S31 to S37 of FIG. 14 is the same as the process from steps S21 to S27 of FIG. 10, the description will be reduced or omitted.

In step S38, when the direct-arrival point sound source specifying unit 210 specifies a direct-arrival point sound source, the speech identification unit 211 identifies whether or not the directly arriving sound is speech spoken by a person. The memory 13 stores a human speech waveform pattern in advance. The speech identification unit 211 compares the waveform pattern of the acquired speech signal to the human speech waveform pattern stored in advance in the memory 13. If the waveform pattern of the acquired speech signal approximately matches the human speech waveform pattern stored in advance in the memory 13, the speech identification unit 211 identifies that the directly arriving sound is speech spoken by a person. On the other hand, if the waveform pattern of the acquired speech signal does not approximately match the human speech waveform pattern stored in advance in the memory 13, the speech identification unit 211 identifies that the directly arriving sound is not speech spoken by a person.

At this point, in the case of identifying that the directly arriving sound is speech spoken by a person (step S38, Yes), the speech recognition controller 204 judges to conduct the speech recognition process, and proceeds to the process in step S39. On the other hand, in the case of identifying that the directly arriving sound is not speech spoken by a person (step S38, No), the speech recognition controller 204 judges not to conduct the speech recognition process, and returns to the process in step S31.

Next, in step S39, when the speech recognition controller 204 judges to conduct the speech recognition process, the speech recognition processor 205 conducts the speech recognition process on the speech signal acquired by the speech acquisition unit 201. Also, when the speech recognition controller 204 judges not to conduct the speech recognition process, the speech recognition processor 205 does not conduct the speech recognition process on the speech signal acquired by the speech acquisition unit 201.

In this way, speech recognition is conducted when the sound directly arriving from a point sound source is human speech, whereas speech recognition is not conducted when the sound arriving from a point sound source is not human speech. For this reason, the speech recognition process may be prevented from being conducted on sound emitted from equipment that is not a person.

Note that the speech identification unit 211 may also identify the speaker when the direct-arrival point sound source specifying unit 210 specifies a direct-arrival point sound source. The method of identifying the speaker is not limited. The speech identification unit 211 may specify personal information such as the rough age or gender of the speaker producing speech, or specify a person using information such as a speech database registered in advance. Consequently, the speech recognition process may be prevented from being conducted on speech that is produced outdoors and passes through a wall to arrive at the microphone 14, or speech produced by someone other than a family registered in the speech database, for example.

Embodiment 9

Figure 15:
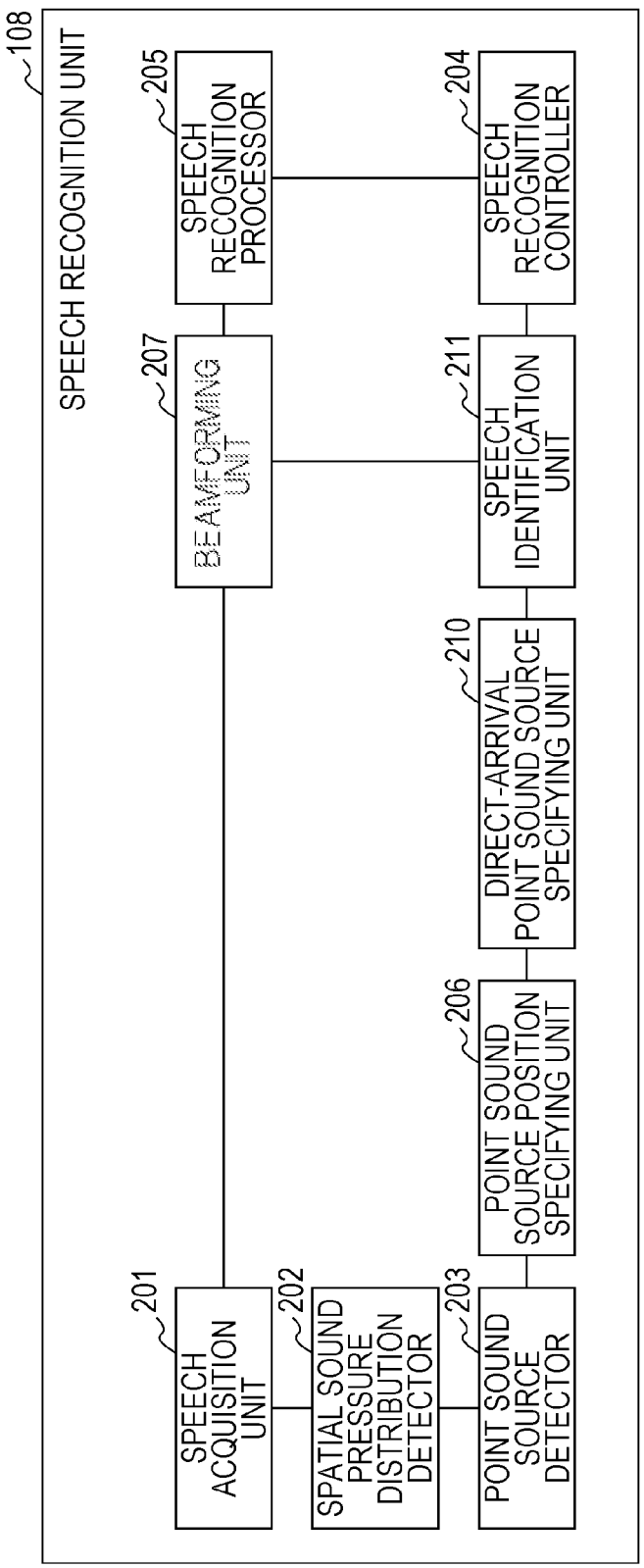
FIG. 15 is a diagram illustrating a configuration of a speech recognition unit according to Embodiment 9 of the present disclosure.

FIG. 15 is a diagram illustrating a configuration of a speech recognition unit according to Embodiment 9 of the present disclosure. The speech recognition unit 108 according to Embodiment 9 is equipped with a speech acquisition unit 201, a spatial sound pressure distribution detector 202, a point sound source detector 203, a speech recognition controller 204, a speech recognition processor 205, a point sound source position specifying unit 206, a beamforming unit 207, a direct-arrival point sound source specifying unit 210, and a speech identification unit 211. Note that the configuration of the equipment 1 is the same as Embodiment 1, and the controller 12 is equipped with the speech recognition unit 108. In Embodiment 9, structural elements that are the same as Embodiment 1 to Embodiment 8 are denoted with the same signs, and the description thereof will be reduced or omitted.

When the direct-arrival point sound source specifying unit 210 specifies a direct-arrival point sound source, the speech identification unit 211 identifies whether or not the directly arriving sound is speech spoken by a person.

When the direct-arrival point sound source specifying unit 210 specifies a direct-arrival point sound source, and the directly arriving sound is identified as speech spoken by a person, the beamforming unit 207 controls the directionality of the microphone 14 to point towards the position of a point sound source specified by the point sound source position specifying unit 206.

In this way, since the directionality of the microphone 14 is controlled to point towards the position of a point sound source identified as a person, speech signal may be acquired reliably from the user, and incorrect operation of speech recognition may be prevented.

Embodiment 10

Figure 16:
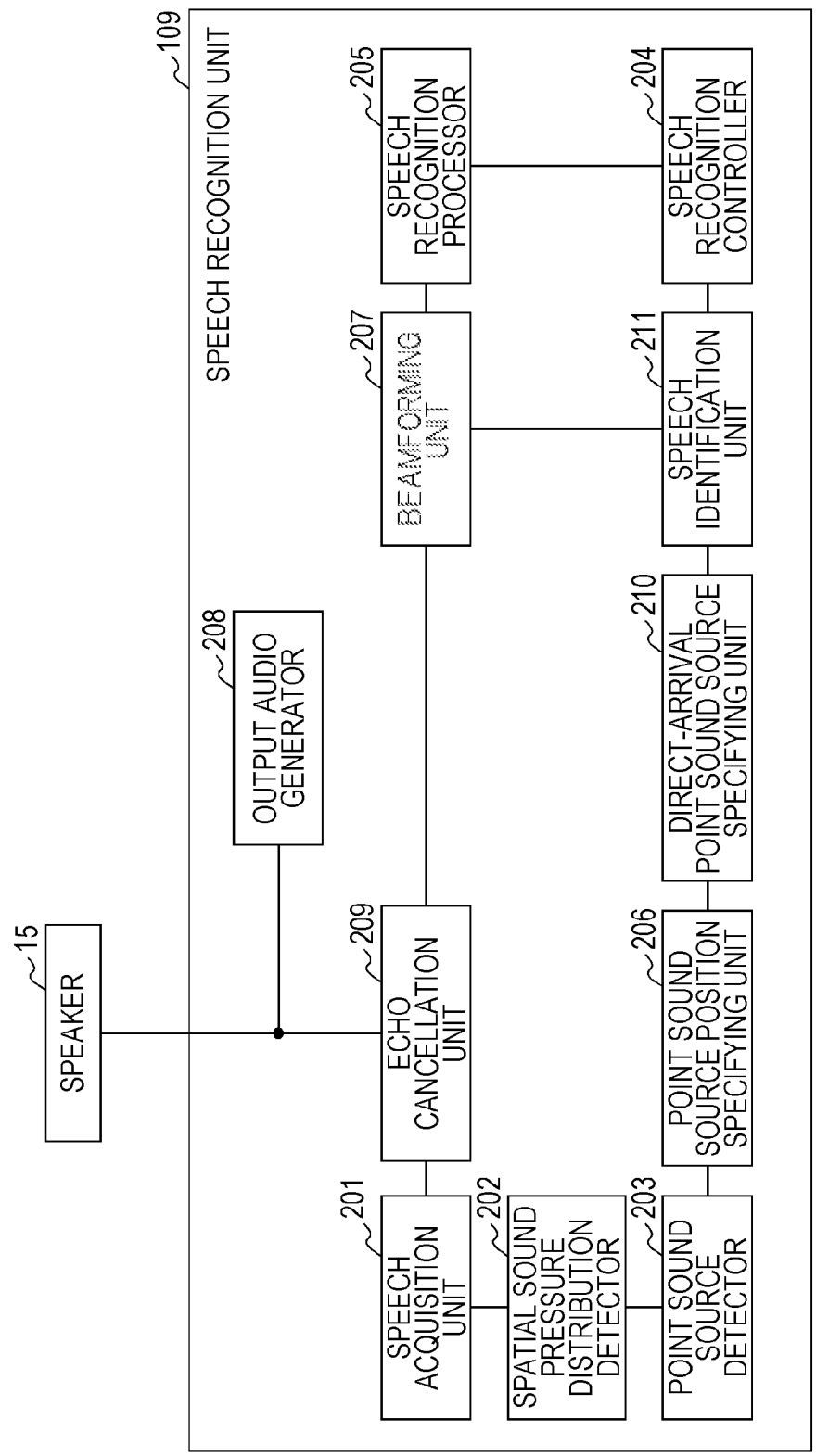
FIG. 16 is a diagram illustrating a configuration of a speech recognition unit according to Embodiment 10 of the present disclosure.

FIG. 16 is a diagram illustrating a configuration of a speech recognition unit according to Embodiment 10 of the present disclosure. The speech recognition unit 109 according to Embodiment 10 is equipped with a speech acquisition unit 201, a spatial sound pressure distribution detector 202, a point sound source detector 203, a speech recognition controller 204, a speech recognition processor 205, a point sound source position specifying unit 206, a beamforming unit 207, an output audio generator 208, an echo cancellation unit 209, a direct-arrival point sound source specifying unit 210, and a speech identification unit 211. Note that the configuration of the equipment 1 is the same as Embodiment 1, and the controller 12 is equipped with the speech recognition unit 109. In Embodiment 10, structural elements that are the same as Embodiment 1 to Embodiment 9 are denoted with the same signs, and the description thereof will be reduced or omitted.

When the direct-arrival point sound source specifying unit 210 specifies a direct-arrival point sound source, the speech identification unit 211 identifies whether or not the directly arriving sound is speech spoken by a person.

When the direct-arrival point sound source specifying unit 210 specifies a direct-arrival point sound source, and the directly arriving sound is identified as speech spoken by a person, the beamforming unit 207 controls the directionality of the microphone 14 to point towards the position of a point sound source specified by the point sound source position specifying unit 206.

Particularly, in the present embodiment, the beamforming unit 207 performs signal processing on the speech signal with the echo component removed by the echo cancellation unit 209, so that the speech signal has directionality in the direction pointing towards the position of the point sound source.

As a result, speech signal may be acquired reliably from a point sound source, and incorrect operation of speech recognition may be prevented.

Embodiment 11

Figure 17:
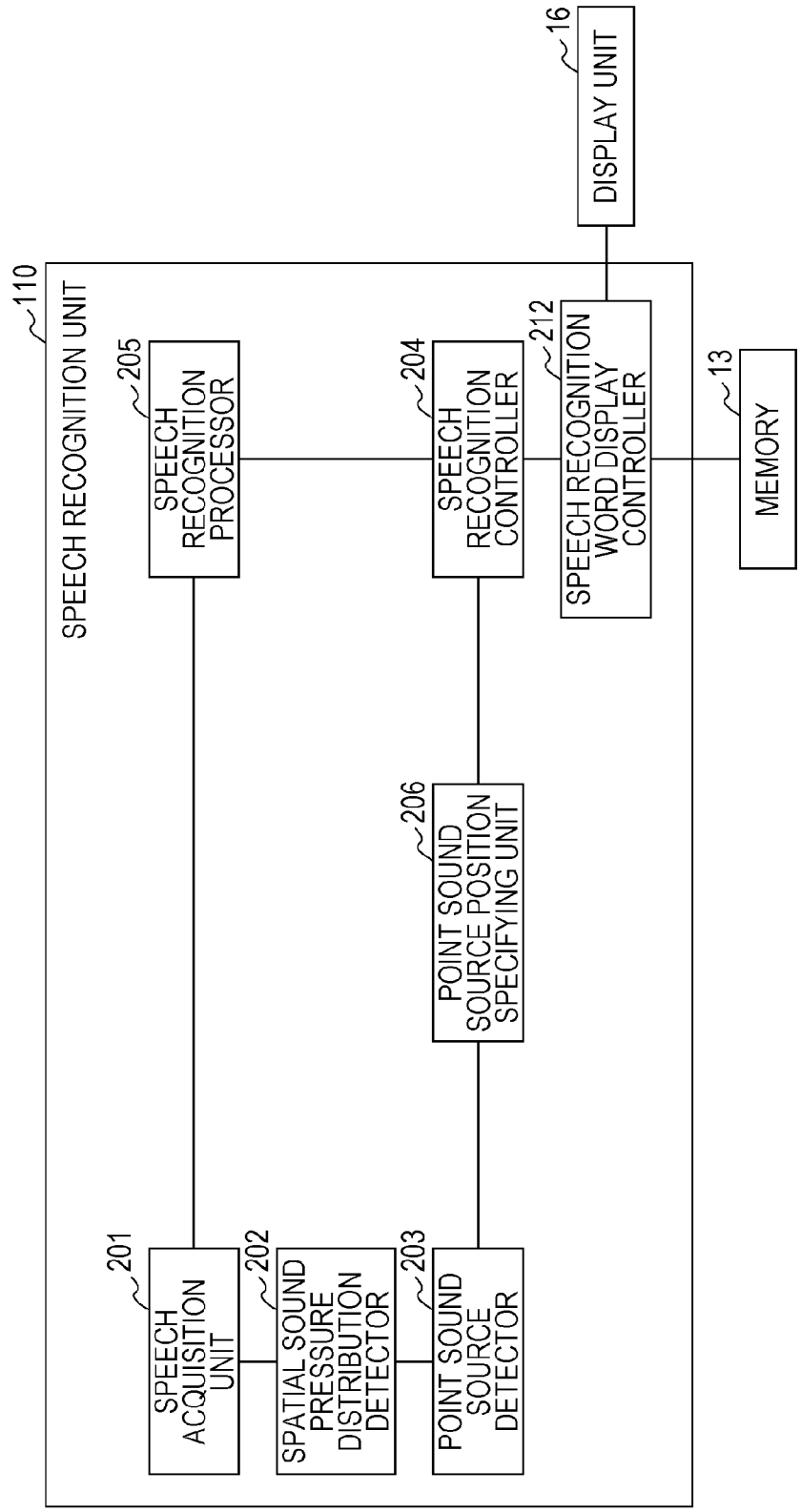
FIG. 17 is a diagram illustrating a configuration of a speech recognition unit according to Embodiment 11 of the present disclosure.

FIG. 17 is a diagram illustrating a configuration of a speech recognition unit according to Embodiment 11 of the present disclosure. The speech recognition unit 110 according to Embodiment 11 is equipped with a speech acquisition unit 201, a spatial sound pressure distribution detector 202, a point sound source detector 203, a speech recognition controller 204, a speech recognition processor 205, a point sound source position specifying unit 206, and a speech recognition word display controller 212. Note that the configuration of the equipment 1 is the same as Embodiment 1, and the controller 12 is equipped with the speech recognition unit 110. In Embodiment 11, structural elements that are the same as Embodiment 1 to Embodiment 10 are denoted with the same signs, and the description thereof will be reduced or omitted.

When the speech recognition controller 204 judges to conduct the speech recognition process, the speech recognition word display controller 212 reads out at least one speech recognition word related to operating the equipment from the memory 13 storing in advance multiple speech recognition words used in the speech recognition process, and displays the at least one read-out speech recognition word on the display unit 16.

A speech recognition word is a word recognizable by speech recognition. For example, when the equipment 1 is a television, the speech recognition words include "Volume up", "Volume down", "Channel up", "Channel down", "Program guide", "Search", "Video", and "Power off".

Figure 18:
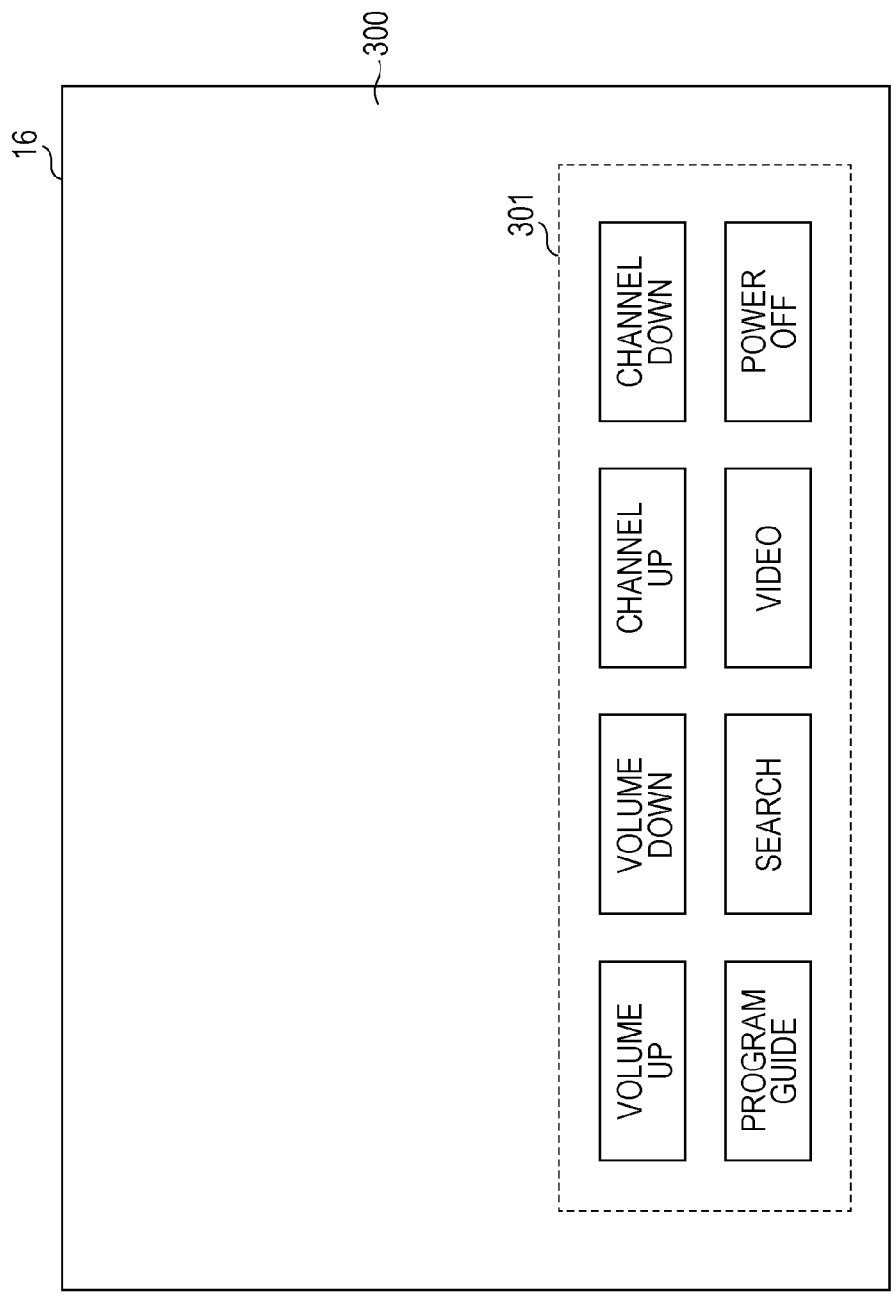
FIG. 18 is a diagram illustrating an example of a display screen displayed on a display unit according to Embodiment 11 of the present disclosure.

FIG. 18 is a diagram illustrating an example of a display screen displayed on a display unit according to Embodiment 11 of the present disclosure.

When the equipment 1 is a television, the speech recognition words 301 illustrated in FIG. 18 are displayed on a display screen 300 of the display unit 16. As illustrated in FIG. 18, the speech recognition word display controller 212 displays on the display unit 16 the speech recognition words 301, including "Volume up", "Volume down", "Channel up", "Channel down", "Program guide", "Search", "Video", and "Power off". Note that the speech recognition words 301 displayed by the speech recognition word display controller 212 are not limited to the above.

In this way, since the speech recognition words used in the speech recognition process are displayed, the user is able to check the displayed speech recognition words, and reliably operate equipment through speech.

Note that although the speech recognition words 301 are displayed in a list at the bottom of the display screen 300 in Embodiment 11, the present disclosure is not particularly limited thereto, and the speech recognition words 301 may also be displayed in a list at the top, center, left edge, or right edge of the display screen 300. Additionally, the speech recognition words 301 may also be scrolled at the bottom of the display screen 300.

In addition, instead of displaying all speech recognition words stored in the memory 13, a portion of the speech recognition words stored in the memory 13 may be displayed. Additionally, speech recognition words with a high frequency of usage by the user may be displayed. Additionally, speech recognition words configured by the user may also be stored in the memory 13.

In addition, the memory 13 may also store speech recognition words related to operating multiple types of equipment, and the speech recognition word display controller 212 may read out speech recognition words related to equipment operated by the user from the memory 13 for display on the display unit 16. Note that when the server 2 is equipped with the speech recognition unit, information for specifying the equipment to be operated by the user is transmitted to the server 2, and speech recognition words are read out from memory on the basis of the information.

In addition, although Embodiment 11 adds the speech recognition word display controller 212 to the configuration of the speech recognition unit from Embodiment 2, the present disclosure is not particularly limited thereto, and the speech recognition word display controller 212 may also be added to the configuration of the speech recognition units from Embodiment 1 and Embodiments 3 to 10.

Embodiment 12

Figure 19:
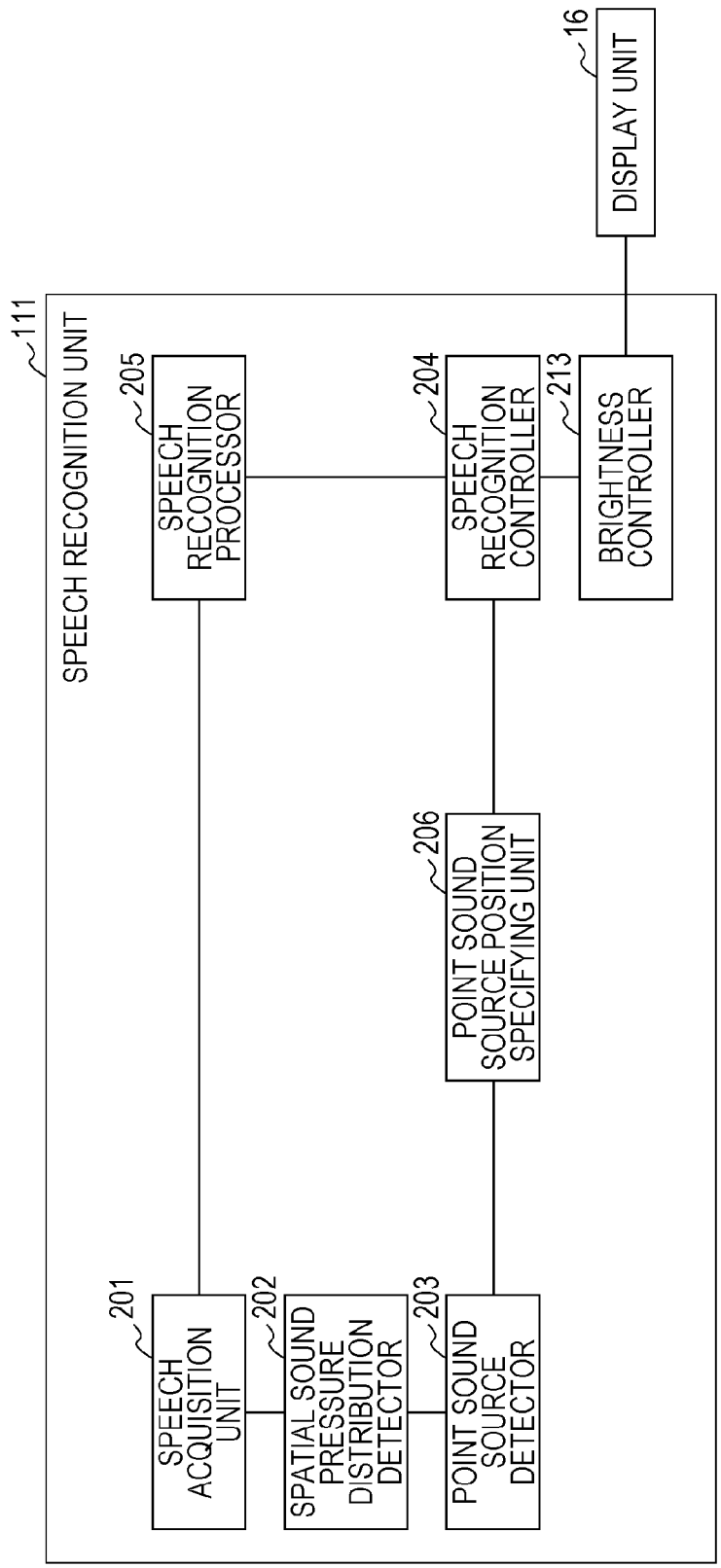
FIG. 19 is a diagram illustrating a configuration of a speech recognition unit according to Embodiment 12 of the present disclosure.

FIG. 19 is a diagram illustrating a configuration of a speech recognition unit according to Embodiment 12 of the present disclosure. The speech recognition unit 111 according to Embodiment 12 is equipped with a speech acquisition unit 201, a spatial sound pressure distribution detector 202, a point sound source detector 203, a speech recognition controller 204, a speech recognition processor 205, a point sound source position specifying unit 206, and a brightness controller 213. Note that the configuration of the equipment 1 is the same as Embodiment 1, and the controller 12 is equipped with the speech recognition unit 111. In Embodiment 12, structural elements that are the same as Embodiment 1 to Embodiment 11 are denoted with the same signs, and the description thereof will be reduced or omitted.

The brightness controller 213 improves the brightness of the display unit 16 when the speech recognition controller 204 judges to conduct the speech recognition process over the brightness of the display unit 16 when the speech recognition controller 204 judges not to conduct the speech recognition process.

Figure 20A:
FIG. 20A is a diagram illustrating an example of a display screen displayed on a display unit when a speech recognition process is conducted, according to Embodiment 12 of the present disclosure.
Figure 20B:
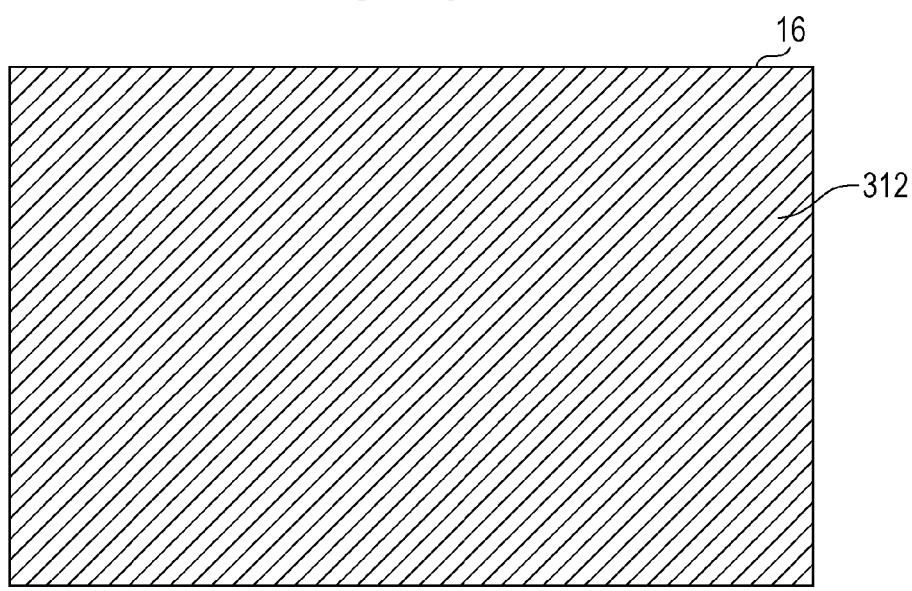
FIG. 20B is a diagram illustrating an example of a display screen displayed on a display unit when a speech recognition process is not conducted, according to Embodiment 12 of the present disclosure.

FIG. 20A is a diagram illustrating an example of a display screen displayed on a display unit when a speech recognition process is conducted, according to Embodiment 12 of the present disclosure, while FIG. 20B is a diagram illustrating an example of a display screen displayed on a display unit when a speech recognition process is not conducted, according to Embodiment 12 of the present disclosure. Note that FIG. 20A and FIG. 20B illustrate an example of display screens 311 and 312 displayed on the display unit 16 when the equipment 1 is a television. Also, in FIG. 20A and FIG. 20B, a difference in brightness is expressed as the presence or absence of hatching.

As illustrated in FIGS. 20A and 20B, the brightness of the display unit 16 when the speech recognition controller 204 judges to conduct the speech recognition process becomes higher than the brightness of the display unit 16 when the speech recognition controller 204 judges not to conduct the speech recognition process.

In this way, by differentiating the brightness of the display unit 16 when the speech recognition process is conducted, and the brightness of the display unit 16 when the speech recognition process is not conducted, the user may be informed of whether or not the speech recognition process is available.

Note that in Embodiment 12, the brightness controller 213 differentiates the overall brightness of the display screen when the speech recognition process is conducted from the overall brightness of the display screen when the speech recognition process is not conducted, but the present disclosure is not particularly limited thereto, and the brightness controller 213 may also differentiate the brightness of part of the display screen when the speech recognition process is conducted from the brightness of part of the display screen when the speech recognition process is not conducted. For example, the brightness controller 213 may differentiate the brightness of an outer edge part of the display screen when the speech recognition process is conducted from the brightness of an outer edge part of the display screen when the speech recognition process is not conducted.

In addition, although Embodiment 12 adds the brightness controller 213 to the configuration of the speech recognition unit from Embodiment 2, the present disclosure is not particularly limited thereto, and the brightness controller 213 may also be added to the configuration of the speech recognition units from Embodiment 1 and Embodiments 3 to 11.

Embodiment 13

Figure 21:
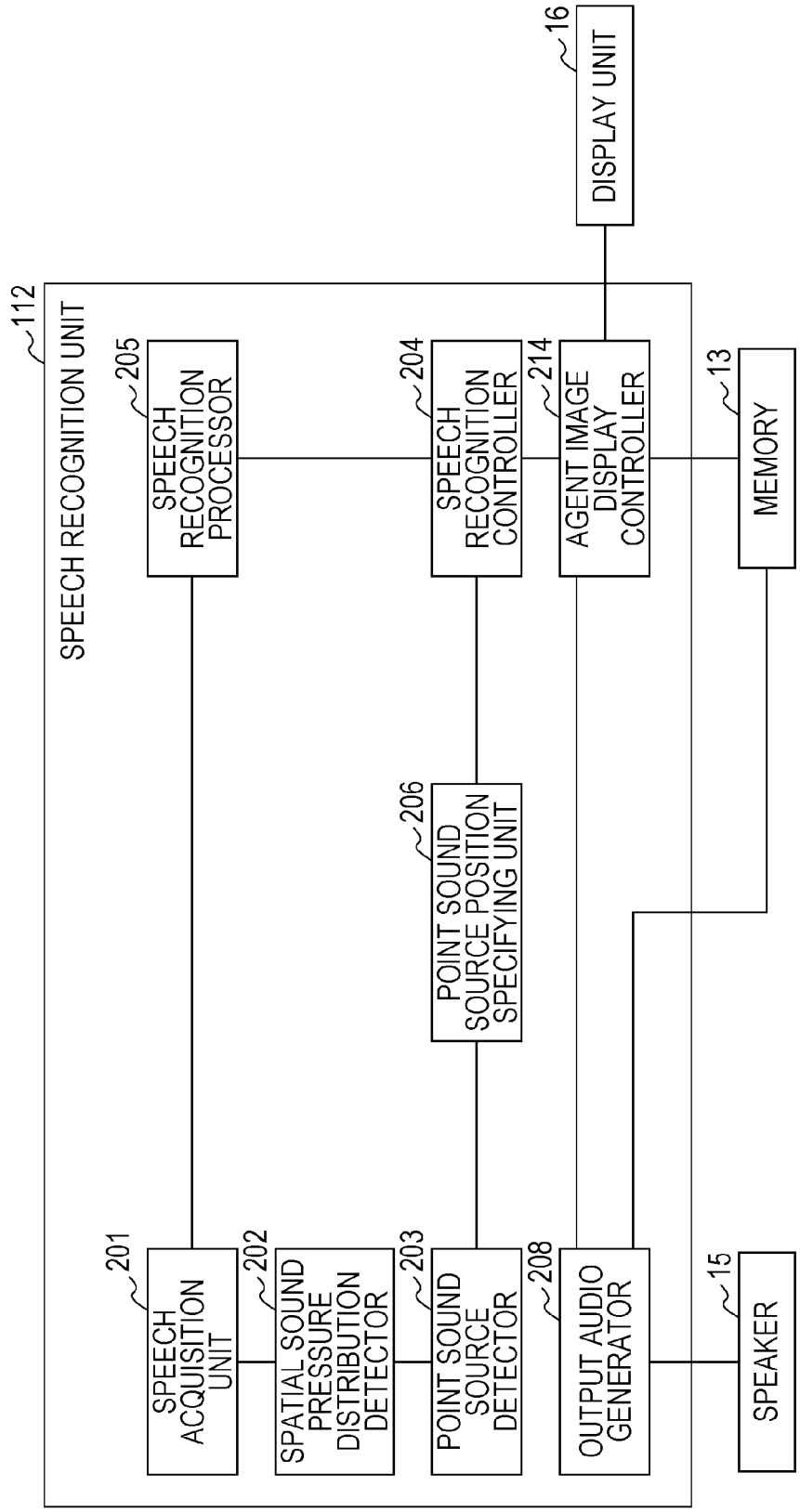
FIG. 21 is a diagram illustrating a configuration of a speech recognition unit according to Embodiment 13 of the present disclosure.

FIG. 21 is a diagram illustrating a configuration of a speech recognition unit according to Embodiment 13 of the present disclosure. The speech recognition unit 112 according to Embodiment 13 is equipped with a speech acquisition unit 201, a spatial sound pressure distribution detector 202, a point sound source detector 203, a speech recognition controller 204, a speech recognition processor 205, a point sound source position specifying unit 206, an output audio generator 208, and an agent image display controller 214. Note that the configuration of the equipment 1 is the same as Embodiment 1, and the controller 12 is equipped with the speech recognition unit 112. In Embodiment 13, structural elements that are the same as Embodiment 1 to Embodiment 12 are denoted with the same signs, and the description thereof will be reduced or omitted.

The output audio generator 208 generates output audio according to the judgment of whether or not to conduct the speech recognition process by the speech recognition controller 204, and outputs from the speaker 15. For example, when the speech recognition controller 204 judges not to conduct speech recognition, the output audio generator 208 generates audio information encouraging the user to move to a position enabling speech recognition.

The agent image display controller 214 displays on the display unit 16 an agent image (animation image) according to the judgment of whether or not to conduct the speech recognition process by the speech recognition controller 204. For example, when the speech recognition controller 204 judges not to conduct speech recognition, the agent image display controller 214 displays an agent image encouraging the user to move to a position enabling speech recognition.

The agent image display controller 214 may also control the display of an agent image in conjunction with output audio when audio information generated by the output audio generator 208 is output. In addition, the memory 13 may also store an agent image in advance, and the agent image display controller 214 may read out, from the memory 13, an agent image according to the judgment of whether or not to conduct the speech recognition process by the speech recognition controller 204, and display the read-out agent image on the display unit 16.

Figure 22:
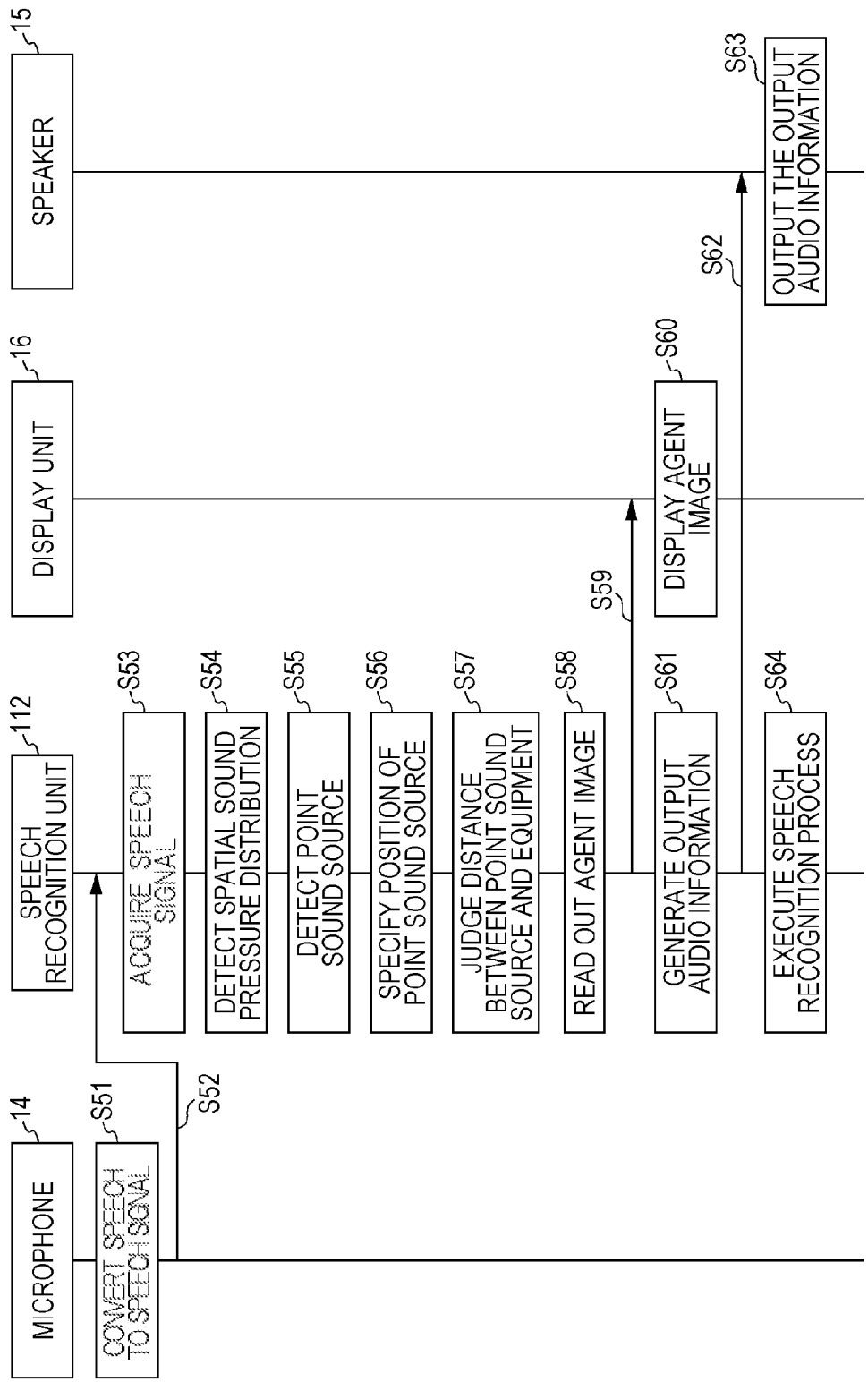
FIG. 22 is a sequence diagram for explaining operation of a speech recognition system according to Embodiment 13 of the present disclosure.

Operation of a speech recognition system according to Embodiment 13 of the present disclosure will now be described. FIG. 22 is a sequence diagram for explaining operation of a speech recognition system according to Embodiment 13 of the present disclosure.

First, in step S51, the microphone 14 converts speech in an analog signal to speech signal in a digital signal.

Next, in step S52, the microphone 14 outputs the converted speech signal to the speech recognition unit 112.

Next, in step S53, the speech acquisition unit 201 acquires the speech signal output by the microphone 14.

Next, in step S54, the spatial sound pressure distribution detector 202 detects a spatial sound pressure distribution indicating a distribution of sound pressure in a space, on the basis of speech signal acquired by the speech acquisition unit 201.

Next, in step S55, the point sound source detector 203 detects a point sound source in the space on the basis of the spatial sound pressure distribution detected by the spatial sound pressure distribution detector 202.

Next, in step S56, the point sound source position specifying unit 206 specifies the position in the space of a point sound source detected by the point sound source detector 203. Note that in the case of judging that a point sound source was detected, the point sound source position specifying unit 206 specifies the position in the space of the point sound source detected by the point sound source detector 203, whereas in the case of judging that a point sound source was not detected, the point sound source position specifying unit 206 does not specify the position in the space of the point sound source detected by the point sound source detector 203.

Next, in step S57, the speech recognition controller 204 judges whether or not the distance between the position of a point sound source and the equipment 1 is shorter than a designated distance.

Next, in step S58, the agent image display controller 214 reads out from the memory 13 an agent image according to the judgment of whether or not to conduct the speech recognition process by the speech recognition controller 204.

Next, in step S59, the agent image display controller 214 outputs the read-out agent image to the display unit 16.

Next, in step S60, the display unit 16 displays the agent image output by the agent image display controller 214.

Next, in step S61, the output audio generator 208 generates output audio information according to the judgment of whether or not to conduct the speech recognition process by the speech recognition controller 204.

Next, in step S62, the output audio generator 208 outputs the generated output audio information to the speaker 15.

Next, in step S63, the speaker 15 outputs the output audio information output by the output audio generator 208.

Next, in step S64, when the speech recognition controller 204 judges to conduct the speech recognition process, the speech recognition processor 205 conducts the speech recognition process on the speech signal acquired by the speech acquisition unit 201. Also, when the speech recognition controller 204 judges not to conduct the speech recognition process, the speech recognition processor 205 does not conduct the speech recognition process on the speech signal acquired by the speech acquisition unit 201.

Figure 23:
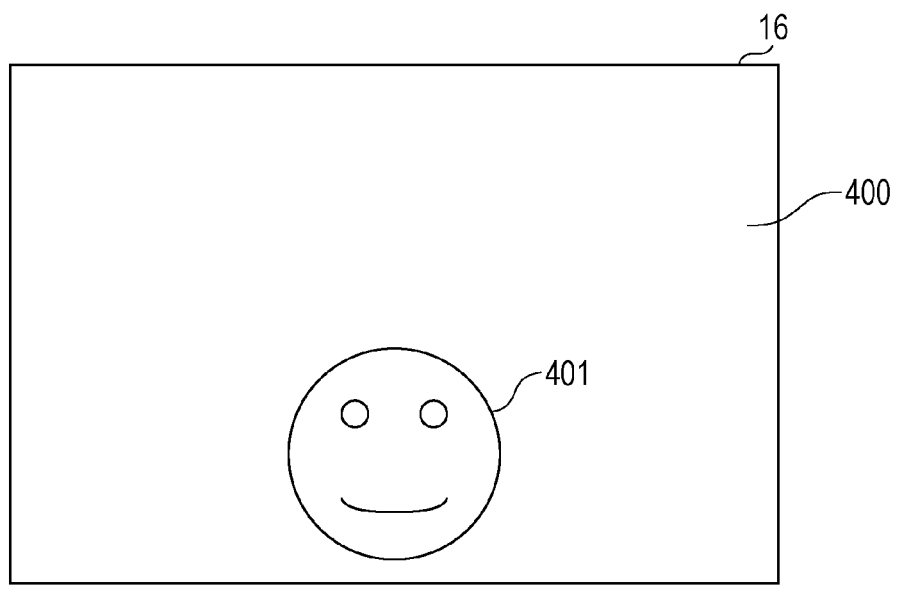
FIG. 23 is a diagram illustrating an example of a display screen displayed on a display unit according to Embodiment 13 of the present disclosure.

FIG. 23 is a diagram illustrating an example of a display screen displayed on a display unit according to Embodiment 13 of the present disclosure. Note that FIG. 23 illustrates an example of a display screen 400 displayed on the display unit 16 when the equipment 1 is a television.

As illustrated in FIG. 23, the agent image display controller 214 displays an agent image 401 resembling a human face on the display screen 400 of the display unit 16.

The agent image 401 moves as though actually speaking, matched to the output audio. The output audio generator 208 reads out from the memory 13 output audio according to the judgment of whether or not to conduct the speech recognition process by the speech recognition controller 204, and outputs to the speaker 15. The agent image display controller 214 reads out from the memory 13 an agent image according to the judgment of whether or not to conduct the speech recognition process by the speech recognition controller 204, and outputs to the display unit 16. Herein, the output audio information and the agent image are stored in association with each other, and the agent image is displayed in conjunction with the output audio information.

In this way, since an agent image (animation image) according to the judgment of whether or not to conduct the speech recognition process by the speech recognition controller 204 is displayed on the display unit 16, it is possible to inform the user whether or not the speech recognition process is available.

Note that although an agent image resembling a human face is displayed in Embodiment 13, the present disclosure is not particularly limited thereto.

In addition, when the speech recognition controller 204 judges to conduct speech recognition, the agent image display controller 214 may also display an agent image that moves according to the user's speech operation.

In addition, although the agent image 401 is displayed at the bottom of the display screen 400 in Embodiment 13, the present disclosure is not particularly limited thereto, and the agent image 401 may also be displayed at the top, center, left edge, or right edge of the display screen 400.

In addition, although Embodiment 13 adds the output audio generator 208 and the agent image display controller 214 to the configuration of the speech recognition unit from Embodiment 2, the present disclosure is not particularly limited thereto, and the output audio generator 208 and the agent image display controller 214 may also be added to the configuration of the speech recognition units from Embodiment 1 and Embodiments 3 to 12.

Note that the specific embodiments discussed in the foregoing primarily include disclosures having the following configurations.

A speech recognition method according to one aspect of the present disclosure is a speech recognition method that recognizes speech for causing equipment to operate, comprising: a speech signal acquiring step of acquiring speech signal from a microphone disposed in a designated space; a spatial sound pressure distribution detecting step of detecting a spatial sound pressure distribution indicating a distribution of sound pressure in the space, on the basis of the speech signal acquired in the speech signal acquiring step; a point sound source detecting step of detecting a point sound source in the space on the basis of the spatial sound pressure distribution detected in the spatial sound pressure distribution detecting step; and a speech recognition controlling step of judging to conduct a speech recognition process on the speech signal acquired in the speech signal acquiring step when the point sound source is detected in the point sound source detecting step.

According to this configuration, when a point sound source is detected, a speech recognition process is conducted on acquired speech signal, whereas when a point sound source is not detected, a speech recognition process is not conducted. For this reason, whether or not to conduct a speech recognition process may be judged easily, and in addition, incorrect operation of speech recognition may be prevented with a low-cost configuration.

In addition, preferably, the above speech recognition method additionally includes a position specifying step of specifying a position in the space of the detected point sound source when the point sound source is detected in the point sound source detecting step, wherein when a distance between the position of the point sound source and the equipment is shorter than a designated distance, the speech recognition controlling step judges to conduct the speech recognition process, whereas when the distance between the position of the point sound source and the equipment is equal to or greater than the designated distance, the speech recognition controlling step judges not to conduct the speech recognition process.

According to this configuration, by judging whether or not the distance between the position of a point sound source and the equipment is shorter than a designated distance, it is possible to judge whether the user is speaking near the equipment in order to operate the equipment, or whether the user is speaking away from the equipment in a manner unrelated to operation of the equipment, and incorrect operation of speech recognition may be prevented with a low-cost configuration.

In addition, preferably, the above speech recognition method additionally includes a directionality controlling step of controlling a directionality of the microphone to point towards the position of the point sound source specified in the position specifying step.

According to this configuration, by controlling the directionality of the microphone to point towards the position of a point sound source, speech signal may be acquired reliably from the point sound source, and incorrect operation of speech recognition may be prevented.

In addition, preferably, the above speech recognition method includes: an output audio generating step of generating output audio information to be output from a speaker; an audio outputting step of outputting the output audio information generated in the output audio generating step as output audio from the speaker; and an echo cancelling step of acquiring the output audio information generated in the output audio generating step, and cancelling an echo component made up of the acquired output audio information from the speech signal acquired in the speech signal acquiring step.

According to this configuration, since output audio information generated in the output audio generating step is acquired, and the acquired output audio information is removed from the speech signal acquired in the speech signal acquiring step as an echo component, speech signal may be acquired reliably from the point sound source, and incorrect operation of speech recognition may be prevented.

In addition, preferably, the above speech recognition method additionally includes: a position specifying step of specifying a position in the space of the detected point sound source when the point sound source is detected in the point sound source detecting step; and a direct-arrival point sound source specifying step of specifying a direct-arrival point sound source from which emitted sound arrives at the microphone directly from among the point sound source whose position was specified in the position specifying step.

According to this configuration, since a direct-arrival point sound source from which emitted sound arrives at the microphone directly is specified from among one or more point sound sources whose positions are specified, it is possible to judge whether the user is speaking in the direction of the equipment in order to operate the equipment, or whether the user is speaking in a different direction from the equipment in a manner unrelated to the operation of the equipment.

In addition, preferably, in the above speech recognition method, the speech recognition controlling step judges to conduct the speech recognition process when the direct-arrival point sound source is specified in the direct-arrival point sound source specifying step, and judges not to conduct the speech recognition process when the direct-arrival point sound source is not specified in the direct-arrival point sound source specifying step.

According to this configuration, when emitted speech arrives at the microphone directly, speech recognition is conducted, whereas when emitted speech does not arrive at the microphone directly, speech recognition is not conducted. For this reason, it is possible to judge whether the user is speaking in the direction of the equipment in order to operate the equipment, or whether the user is speaking in a different direction from the equipment in a manner unrelated to the operation of the equipment, and incorrect operation of speech recognition may be prevented with a low-cost configuration.

In addition, preferably, the above speech recognition method additionally includes: a direct-arrival point sound source specifying step of specifying a direct-arrival point sound source from which emitted sound arrives at the microphone directly from among the point sound source whose position was specified in the position specifying step, wherein the directionality controlling step controls the directionality of the microphone to point towards the position of the point sound source specified in the position specifying step when the direct-arrival point sound source is specified in the direct-arrival point sound source specifying step.

According to this configuration, since the directionality of the microphone is controlled to point towards the position of a direct-arrival point sound source from which emitted speech arrives at the microphone directly, speech signal may be acquired reliably from the point sound source, and incorrect operation of speech recognition may be prevented.

In addition, preferably, the above speech recognition method additionally includes: a speech identifying step of identifying whether or not the directly arriving sound is speech spoken by a person when the direct-arrival point sound source is specified in the direct-arrival point sound source specifying step, wherein the speech recognition controlling step judges to conduct the speech recognition process when the directly arriving sound is identified as being speech spoken by a person in the speech identifying step, and judges not to conduct the speech recognition process when the directly arriving sound is identified as not being speech spoken by a person in the speech identifying step.

According to this configuration, speech recognition is conducted when the sound directly arriving from a point sound source is human speech, whereas speech recognition is not conducted when the sound arriving from a point sound source is not human speech. For this reason, the speech recognition process may be prevented from being conducted on sound emitted from equipment that is not a person.

In addition, preferably, the above speech recognition method additionally includes a speech recognition word displaying step of, when it is judged to conduct the speech recognition process in the speech recognition controlling step, reading out a word used in the speech recognition process from a storage unit that stores the word in advance, and displaying the read-out word on a display unit.

According to this configuration, since the speech recognition words used in the speech recognition process are displayed, the user is able to check the displayed speech recognition words, and reliably operate equipment through speech.

In addition, preferably, the above speech recognition method additionally includes a brightness controlling step of improving a brightness of a display unit when it is judged to conduct the speech recognition process in the speech recognition controlling step over a brightness of a display unit when it is judged not to conduct the speech recognition process in the speech recognition controlling step.

According to this configuration, since the brightness of the display unit when the speech recognition process is conducted differs from the brightness of the display unit when the speech recognition process is not conducted, the user may be informed of whether or not the speech recognition process is available.

In addition, preferably, the above speech recognition method additionally includes an animation image displaying step of displaying on a display unit an animation image according to a judgment of whether or not to conduct the speech recognition process in the speech recognition controlling step.

According to this configuration, since an animation image according to the judgment of whether or not to conduct the speech recognition process is displayed on the display unit, it is possible to inform the user whether or not the speech recognition process is available.

A speech recognition device according to another aspect of the present disclosure is a speech recognition device that recognizes speech for causing equipment to operate, comprising: a speech signal acquisition unit that acquires speech signal from a microphone disposed in a designated space; a spatial sound pressure distribution detector that detects a spatial sound pressure distribution indicating a distribution of sound pressure in the space, on the basis of the speech signal acquired by the speech signal acquisition unit; a point sound source detector that detects a point sound source in the space on the basis of the spatial sound pressure distribution detected by the spatial sound pressure distribution detector; and a speech recognition controller that judges to conduct a speech recognition process on the speech signal acquired by the speech signal acquisition unit when the point sound source is detected by the point sound source detector.

According to this configuration, when a point sound source is detected, a speech recognition process is conducted on acquired speech signal, whereas when a point sound source is not detected, a speech recognition process is not conducted. For this reason, whether or not to conduct a speech recognition process may be judged easily, and in addition, incorrect operation of speech recognition may be prevented with a low-cost configuration.

Note that the specific embodiments or working examples given in the detailed description are merely clarifications of the technical content of the present disclosure. The present disclosure should not be interpreted within a narrow scope limited to only such specific examples, and various modifications may be carried out within the scope of the spirit and the claims of the present disclosure.

A speech recognition method and a speech recognition device according to the present disclosure are able to prevent incorrect operation of speech recognition with a low-cost configuration, and are useful as a speech recognition method and a speech recognition device that recognize speech for causing equipment to operate.

What is claimed is:

1. A speech recognition method that recognizes speech for causing equipment to operate, comprising:
    acquiring speech signal from a microphone disposed in a designated space;
    detecting a point sound source in the designated space on the basis of the acquired speech signal;
    judging to conduct a speech recognition process on the acquired speech signal when the point sound source is detected by the detecting of the point sound source; and
    detecting a spatial sound pressure distribution indicating a distribution of sound pressure in the designated space on the basis of the acquired speech signal,
    wherein in the detecting of the point sound source, the point sound source is detected on the basis of the spatial sound pressure distribution,
    wherein the spatial sound pressure distribution is a sound pressure distribution at designated angles with reference to a position of the microphone, and
    wherein the detecting of the point sound source includes
        specifying an angular range of one or more sound sources for which sound pressure in the speech signal is higher than a designated threshold, on the basis of the spatial sound pressure distribution, and
        detecting, from among the specified one or more sound sources, a sound source having a width of angular range that is less than or equal to a designated width as a point sound source.

2. The speech recognition method according to claim 1,
    wherein the judging, on the basis of the spatial sound pressure distribution, judges to conduct a speech recognition process on a sound source detected in a region within a designated angle from the microphone, and judges not to conduct a speech recognition process on a sound source detected in a region outside a designated angle from the microphone.

3. The speech recognition method according to claim 1, further comprising:
    specifying a position in the designated space of the detected point sound source when the point sound source is detected in the detecting of a point sound source,
    wherein when a distance between the position of the point sound source and the equipment is shorter than a designated distance, the judging judges to conduct the speech recognition process, whereas when the distance between the position of the point sound source and the equipment is equal to or greater than the designated distance, the judging judges not to conduct the speech recognition process.

4. The speech recognition method according to claim 3, further comprising:
    controlling a directionality of the microphone to point towards the specified position of the point sound source.

5. The speech recognition method according to claim 1, further comprising:
    generating output audio information to be output from a speaker;
    outputting the generated output audio information as output audio from the speaker; and
    removing the generated output audio information from the acquired speech signal as an echo component.

6. The speech recognition method according to claim 1, further comprising:
    specifying a position in the designated space of the detected point sound source when the point sound source is detected by the detecting of the point sound source; and
    specifying a direct-arrival point sound source from which emitted sound arrives at the microphone directly for the point sound source whose position is specified.

7. The speech recognition method according to claim 6,
    wherein the judging judges to conduct the speech recognition process when the direct-arrival point sound source is specified in the specifying of the direct-arrival point sound source, and judges not to conduct the speech recognition process when the direct-arrival point sound source is not specified in the specifying of the direct-arrival point sound source.

8. The speech recognition method according to claim 3, further comprising:
    specifying a direct-arrival point sound source from which emitted sound arrives at the microphone directly for the point sound source whose position is specified; and
    controlling a directionality of the microphone to point towards the specified position of the point sound source when the direct-arrival point sound source is specified.

9. The speech recognition method according to claim 6, further comprising:

identifying whether or not the directly arriving sound is speech spoken by a person when the direct-arrival point sound source is specified, wherein the judging judges to conduct the speech recognition process when the directly arriving sound is identified as being speech spoken by a person, and judges not to conduct the speech recognition process when the directly arriving sound is identified as not being speech spoken by a person.

10. The speech recognition method according to claim 1, further comprising:

when the speech recognition process is judged to be conducted in the judging, reading out at least one word related to operating the equipment from a storage storing in advance a plurality of words used in the speech recognition process, and displaying the at least one read-out word on a display.

11. The speech recognition method according to claim 1, further comprising:

increasing a brightness of a display when the judging judges to conduct the speech recognition process over a brightness of a display unit when the judging judges not to conduct the speech recognition process.

12. The speech recognition method according to claim 1, further comprising:

displaying on a display an animation image according to a judgment of whether or not to conduct the speech recognition process in the judging.

13. A speech recognition device that recognizes speech for causing equipment to operate, comprising:

one or more memories; and circuitry that, in operation acquires speech signal from a microphone disposed in a designated space;

detects a point sound source in the designated space on the basis of the acquired speech signal;

judges to conduct a speech recognition process on the acquired speech signal when the point sound source is detected; and detects a spatial sound pressure distribution indicating a distribution of sound pressure in the designated space on the basis of the acquired speech signal, wherein the point sound source is detected on the basis of the spatial sound pressure distribution, wherein the spatial sound pressure distribution is a sound pressure distribution at designated angles with reference to a position of the microphone, and wherein detecting of the point sound source includes specifying an angular range of one or more sound sources for which sound pressure in the speech signal is higher than a designated threshold, on the basis of the spatial sound pressure distribution, and detecting, from among the specified one or more sound sources, a sound source having a width of angular range that is less than or equal to a designated width as a point sound source.

* * * * *